United States Patent [19]

Hings

[11] Patent Number: 4,458,205
[45] Date of Patent: Jul. 3, 1984

[54] GEOMAGNETIC PROSPECTING METHOD WITH MEASUREMENTS OBTAINED DURING AN INTERNAL OF ONE TO TEN MINUTES TIME DURATION

[76] Inventor: Donald L. Hings, 281 N. Howard Ave., Burnaby, B. C., Canada, V5B 1J4

[21] Appl. No.: 200,569

[22] Filed: Oct. 24, 1980

[51] Int. Cl.³ .............................................. G01V 3/00
[52] U.S. Cl. ..................................................... 324/345
[58] Field of Search ................ 324/247, 345, 346, 350

[56] References Cited

U.S. PATENT DOCUMENTS

| | | | |
|---|---|---|---|
| 2,671,275 | 3/1954 | Burns | 324/247 X |
| 2,822,515 | 2/1958 | Klaasse | 324/247 |
| 3,085,197 | 4/1963 | Hings | 324/8 |
| 3,126,510 | 3/1964 | McLauglin et al. | 324/247 X |
| 3,324,385 | 6/1967 | Hings | 324/8 |
| 3,514,693 | 5/1970 | Cagniard | 324/350 |
| 3,943,436 | 3/1976 | Pirson et al. | 324/8 |
| 4,210,869 | 7/1980 | Groenendyke et al. | 324/349 |

FOREIGN PATENT DOCUMENTS

| | | | |
|---|---|---|---|
| 1540282 | 9/1968 | France | 324/345 |

OTHER PUBLICATIONS

The Reviews of Geophysics and Space Physics, vol. 18, No. 1, pp. 203–209.
The Application of Magneto Telluric Soundings to Petroleum and Geothermal Exploration in Non-Seismic Areas: Case Histories, Proceedings of the Twenty-Third Int. Geophysical Symposium, Varna, Bulgaria, 10/78, pp. 6–8.

*Primary Examiner*—Gerard R. Strecker
*Attorney, Agent, or Firm*—Pearne, Gordon, Sessions, McCoy, Granger & Tilberry

[57] ABSTRACT

A geomagnetic prospecting system and method are disclosed to determine the presence of hydrocarbon-bearing substrata below the surface of the earth. A plurality of station sites are selected each having angle measuring means and each angle measuring means having first and second magnetic field detection units perpendicular to each other. The first detection unit measures the vertical inclination angle, i.e., the magnetic dip needle angle of inclination, and the second detection unit measures the horizontal declination angle from true north. Each detection unit is mechanically or electrically adjusted to be substantially on a null of the magnetic field of the earth, and preferably is adjusted slightly off null to a more sensitive portion of the field detection pattern. Readings of the inclination and declination angles are taken substantially simultaneously at the plurality of station sites, and the presence of hydrocarbon-bearing substrata is indicated if both inclination and declination angles move toward negative in a one to ten-minute time period, "negative" being defined as an inclination angle reducing the angle toward north and an eastern declination angle change toward west. This gives an immediate indication of the probable presence or absence of hydrocarbon substrata, so that a traverse line of station sites is not required, but, instead, one may move at random toward areas on the surface of the earth which continue to give promising results.

23 Claims, 23 Drawing Figures

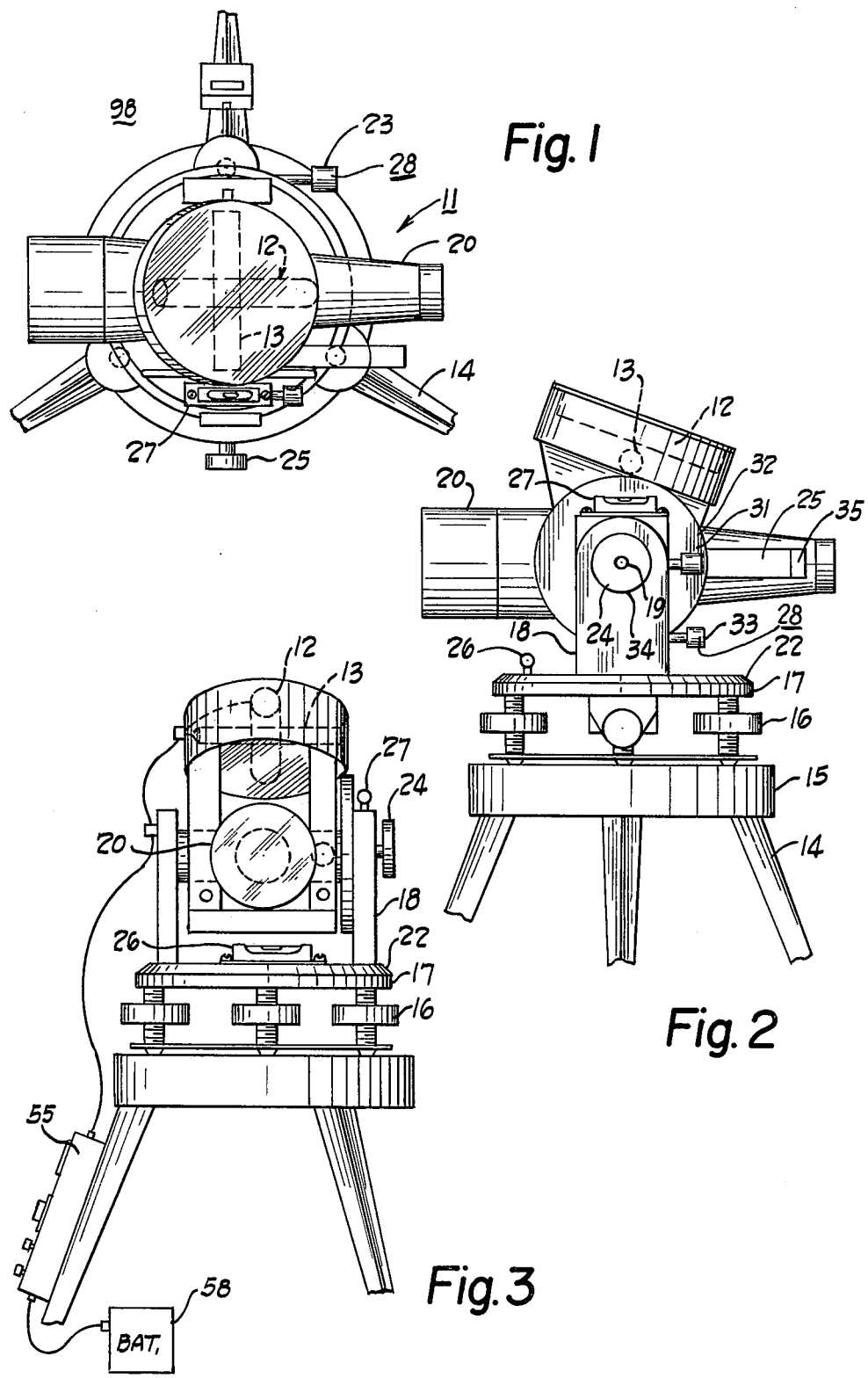

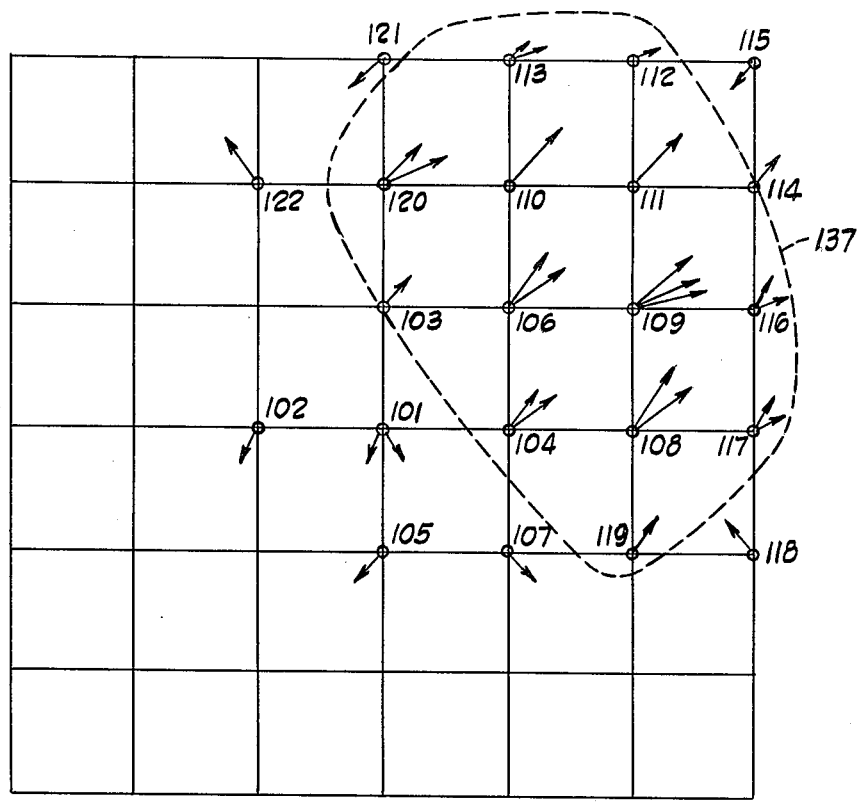
HYDROCARBON ANOMALOUS ANGLES
8-11 AM
CENTRAL NORTHERN STATES
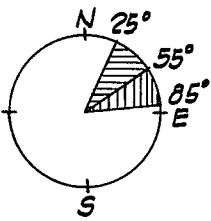
Fig. 8

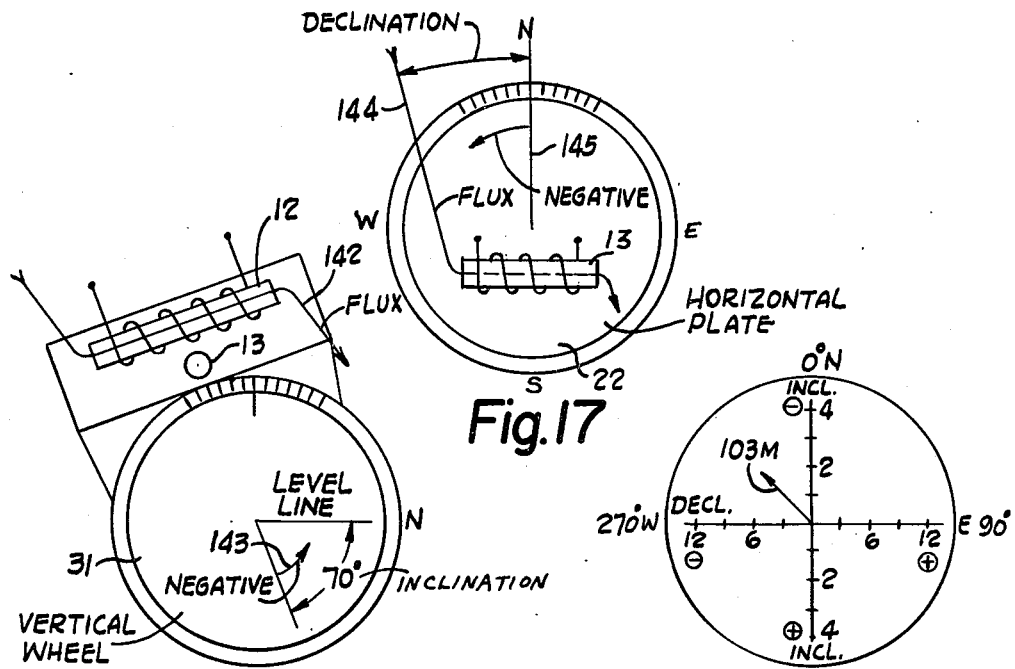
Fig.16  Fig.17  Fig.18
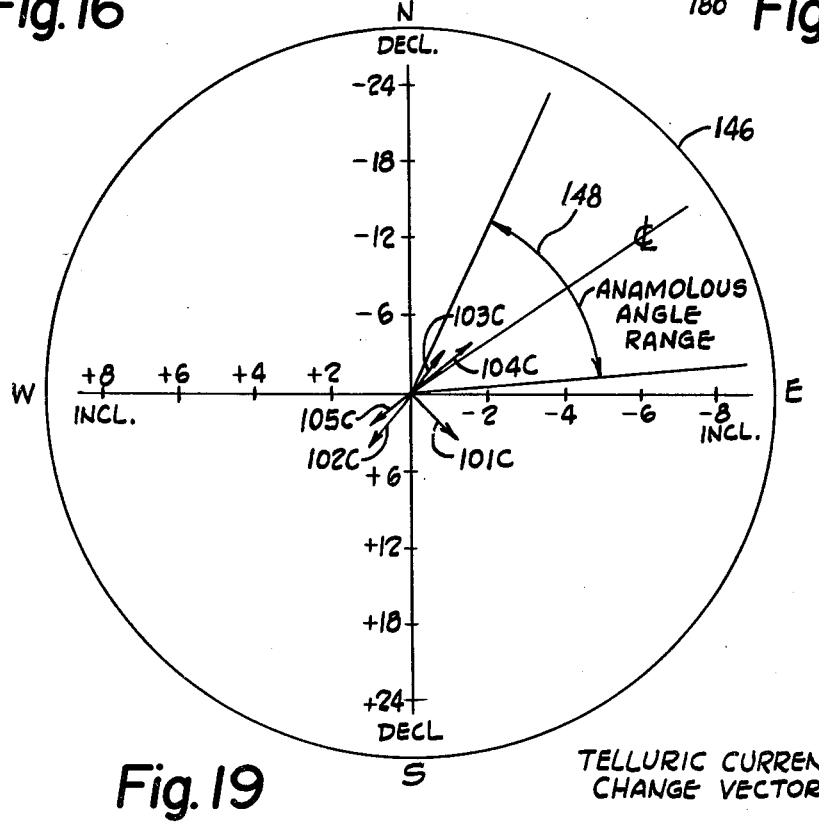
Fig.19  TELLURIC CURRENT CHANGE VECTORS

GEOMAGNETIC PROSPECTING METHOD WITH MEASUREMENTS OBTAINED DURING AN INTERNAL OF ONE TO TEN MINUTES TIME DURATION

BACKGROUND OF THE INVENTION

My previous U.S. Pat. No. 3,085,197 disclosed an apparatus and method for geophysical prospecting; however, it required the setting up of a number of station sites and establishing a traverse preferably from west to east along a number of such station sites in a given traverse line. At each station a theodolite was set up, leveled, and zeroed in on the traverse line as a zero reference. An electrical circuit was energized and the theodolite head was moved to establish a null both along the dip needle angle and along a horizontal plane. A sensing coil was rotated at a slow speed and readings for the horizontal declination and vertical inclination were obtained together with the time of operation. The theodolite was then removed to the second station along the traverse line and the above procedure repeated. The theodolite was moved from the third to the nth station along the traverse line and again this same procedure was repeated. A second and third traverse line of station sites might be established in order to cover a possible field whereat it was hoped that a hydrocarbon deposit might lie below the surface of the earth. Averages of the inclinations were obtained and averages of the declinations obtained. Deviations from these averages were then obtained and vectors were plotted with the vertical deviation along the Y axis and the horizontal deviation along the X axis. A strike line was drawn along those station sites showing the greatest potential change and which had vectors all pointing generally toward a central location. Readings at station sites along the strike line were taken at two different times during the same day in order to obtain two sets of readings during two different diurnal conditions of the telluric current.

Also disclosed in that patent was a system wherein two separate theodolites were set up at a given station site. The settings for the two vertical inclination readings were set off the null condition on opposite sides and were connected in bucking relationship. Sample readings were taken periodically. Further, it was disclosed in this patent that a plurality of station sites might have the theodolites set up so that a plurality of such stations could have simultaneous recording of the vertical inclination only.

A difficulty with that patented system was the considerable length of time required because only one differential reading per station/day sequence was obtained and also it was necessary to carry an azimuth or to work along a traverse line, which limited flexibility.

My prior U.S. Pat. No. 3,324,385 required the use of an external and movable armature in order to locate the presence of an anomaly below the surface of the earth.

The patent to Pirson et al U.S. Pat. No. 3,943,436 follows the generally accepted procedure that the direction and strength of the earth's currents are indicative of the deeper substrata resistance. Pirson et al discloses the measuring of the total earth magnetic field intensity at a plurality of stations, and requires a closed traverse around a given area on the surface of the earth.

The Reviews of Geophysics and Space Physics, Vol. 18, No. 1, pp. 203-209, Feb. 1980, has an article entitled "Geomagnetic Depth Sounding by Induction Arrow Representation: A Review." This article reviews a number of the previous efforts to measure the upper atmosphere geophysics by the use of arrays of earth surface-based magnetometers. The review starts with Gauss in 1838 and proceeds to the present. However, none of these articles relate to any form of geophysical exploration, but show the present acceptable methods and tools utilized when delineating telluric current induction, measured only by magnetometers.

The article, *The Application of Magneto Telluric Soundings to Petroleum and Geothermal Exploration in Non-Seismic Areas: Case Histories*, presented at and published in the proceedings of the Twenty-Third International Geophysical Symposium, Varna, Bulgaria October 1978, gives a case history 2 at pp. 6-8 of the article, and this article indicates that it is generally accepted that the direction and strength of the earth's currents are indicative of the deeper substrata resistance. However, most telluric current methods utilize ground electrodes along a closed traverse as a means of obtaining directionally anomalous areas.

SUMMARY OF THE INVENTION

The difficulties encountered in the prior art systems and methods of geophysical exploration include the slowness of the exploration techniques. Traverses are required, and often a second traverse, in order to provide meaningful data to determine the type of substrata involved. Often this means that sensitive instruments must be set up at two different times, with the inherent problems of leveling and attempting to recreate the identical physical position the second time which was established the first time. Errors inherently are encountered in such a double physical set-up of the equipment. Also, the fact that the first traverse is made without any knowledge gained as to whether any hydrocarbons exist below the surface of the earth makes such initial traverse quite meaningless until analyzed by data obtained from a second traverse or other data. Therefore, as one is making the traverse, one has no idea whether any hydrocarbons are present underfoot.

This problem is solved by a prospecting system to determine the presence of hydrocarbon bearing substrata comprising, in combination, angle measuring means to determine the inclination and declination angles, respectively, of the magnetic field of the earth at a plurality of station sites, adjustment means connected to said angle measuring means capable of adjustment of said angle measuring means to a condition of high sensitivity to changes in the magnetic field direction of the earth, said angle measuring means upon indicating a change in said inclination angle toward north and a change in said declination angle toward west during a first time interval in the order of one to ten minutes duration for each of two such station sites denoting the presence of hydrocarbon-bearing substrata between said two station sites.

The problem is further solved by a geomagnetic prospecting system comprising, in combination, a plurality of station instruments, said instruments adapted to be set up at different station sites relative to the surface of the earth, each said station instrument including first and second magnetic field detecting means, each detecting means having a field sensitivity pattern with a null and adapted to have a signal output dependent on detected magnetic field strength, means to establish said first detecting means null in a first plane which includes substantially the dip needle angle of inclination for that latitude to establish a substantial null of signal output therefrom due to the magnetic field of the earth, means to establish said second detecting means substantially perpendicular to said first detecting means and to establish a substantial null of signal output therefrom due to the magnetic field of the earth, and means to determine the signal outputs of said first and second detecting means at substantially the same period of time from said plurality of station instruments.

The problem is further solved by utilizing magnetic detection units in the geomagnetic determination of the earth below the surface thereof, comprising the steps of establishing a plurality of station sites on the earth's surface, placing at each of said sites first and second magnetic detection units to determine first and second signals dependent upon the magnetic field strength of the earth, adjusting said first unit to establish said first signal dependent on substantially a null of the magnetic field of the earth in a first plane which includes the dip needle angle of inclination for that latitude, adjusting said second unit to establish said second signal dependent on substantially a null of the magnetic field of the earth in a second plane perpendicular to said first plane, indicating each of said two signals during a first time period in the order of one to ten minutes for said plurality of station sites, and experimentally determining the presence of a hydrocarbon-bearing substrate below the surface of the earth between any two station sites whereat said first signals from each of said two station sites have a change during said first time period toward north and said second signals from each of said two station sites have a change during said first time period toward west.

The problem is further solved by an underwater prospecting system to determine the presence of hydrocarbon bearing substrata comprising, in combination angle measuring means to determine the inclination and declination angles, respectively, of the magnetic field of the earth at a given station site, means to orient said angle measuring means at a stationary site on the bed of a body of water on the earth, adjustment means connected to said angle measuring means and in conjunction with said orienting means capable of adjustment of said angle measuring means to a condition of high sensitivity to changes in the magnetic field of the earth, and said angle measuring means upon indicating a change in said inclination angle toward north and a change in said declination angle toward west during a first time interval in the order of one to ten minutes' duration for said given station site denoting the presence of westerly dipping hydrocarbon bearing substrata below said station site.

The problem is further solved by utilizing a subsea geomagnetic prospecting system, comprising, in combination a submarine instrumented vehicle, means to move said vehicle under the surface of a body of water on the earth, first and second substantially mutually perpendicular magnetic field detecting means in said vehicle, each detecting means having a field sensitivity pattern with a null and adapted to have a signal ouptut dependent on detected magnetic field strength, first adjusting means including the orientation of said vehicle relative to the earth to establish said first detecting means in a first plane which includes substantially the dip needle angle of inclination for that latitude to establish substantially a null of signal output therefrom due to the magnetic field of the earth, second adjusting means including the orientation of said vehicle relative to the earth in a second plane with substantially a null of signal output therefrom due to the magnetic field of the earth, and means to determine the signal outputs of said first and second detecting means during the same period of time.

The problem is further solved by utilizing a submarine vehicle and magnetic detection units in geomagnetic prospecting, comprising the steps of mounting in a submarine vehicle first and second magnetic detection units to determine first and second signals dependent upon the magnetic field strength of the earth, orienting said vehicle in a stationary position on the bed of a body of water on the earth, adjusting said first unit in accordance with said mounting and orienting to establish said first signal dependent on substantially a null of the magnetic field of the earth in a first plane which includes the dip needle angle of inclination for that latitude, adjusting said second unit in accordance with said mounting and orienting, to establish said second signal dependent on substantially a null of the magnetic field of the earth in a second plane perpendicular to said first plane, indicating each of said two signals during a first time period in the order of one to ten minutes, and experimentally determining the presence of a westerly dipping hydrocarbon bearing substrata below the bed of the body of water and below said vehicle upon said first signal therefrom having a change during said first time period toward north and said second signal therefrom having a change during said first time period toward west.

A change in the magnetic vertical inclination toward a smaller declination angle, i.e., toward north, is considered negative. A change in the magnetic horizontal declination from east toward west is considered negative within an eastern magnetic declination. When both changes in the inclination and declination are negative, then in the western United States this is considered an indication of a hydrocarbon deposit in the substrata below that station site. The reason for this is that the substrata generally slopes downwardly toward the west in the western part of the United States, and any oil seepage migrates upwardly through any fractures or faults in the rock and appears to collect in the substrata with salt water or brackish water below the oil. This contact of the oil and salt water in porous rock or sand creates a form of battery, referred to as a self-potential, establishing a local current which is generally vertical or generally perpendicular to the substrata, and this local electrical current reacts with the diurnal telluric current to bias or distort such telluric current flow, and hence causes a consistent distortion locally in the magnetic field of the earth. This flow distortion is caused by the diurnal change in the telluric current during daylight hours, and hence this change can be observed consistently on the angle measuring means of the present invention over areas above the hydrocarbons.

Accordingly, an object of the invention is to provide a geophysical prospecting system by which immediate detection of the presence of hydrocarbons below the surface of the earth may be obtained.

Another object of the invention is to provide a geophysical prospecting method to detect the underground presence of hydrocarbons within about ten minutes.

A still further object of the invention is to provide a geomagnetic prospecting system utilizing station instruments with first and second detecting means substantially perpendicular and each on a substantial null of signal output due to the magnetic field of the earth.

An object of the invention is to provide a geophysical means and method to automatically determine by magnetic induction the direction of the earth's telluric currents in relation to solar influence by means of an independent data acquisition instrument.

Another object of the invention is to provide a multiplicity of independent telluric current tracking stations remotely controllable to have data acquisition periods at similar times for a designated area of exploration, to thereby provide a mapping of the features of the substrata telluric current distribution to ascertain the presence or absence of a hydrocarbon anomaly.

Another object of the invention is to provide a geophysical survey system wherein the magnetic field directional variations induced by direct current components of the telluric currents are meaningful in indicating a hydrocarbon substrata anomaly where the variations have a meaningful sign duration exceeding a one minute interval of time.

Another object of the invention is to provide a system which automatically indicates both the vertical and horizontal variations of the total magnetic field angle in minutes and seconds of arc with respect to a relatively short period of time.

Still another object of the invention is to provide a system to locate variations in the telluric current distribution in the substrata created by hydrocarbon deposits and associated strata of brackish water.

A still further object of the invention is to provide a method of determining and recording the directional variations in the telluric current of the earth substantially simultaneously at a multiplicity of station sites over a designated area, preferably during the forenoon period, to thereby produce a mapping plan to indicate those areas on the surface of the earth above a hydrocarbon-impregnated substrata.

Another object of the invention is to provide a method of geophysical prospecting for hydrocarbon deposits, wherein telluric direction finders are established at a plurality of sites, the equipment at each site being set at the angle of the total magnetic field of the earth for that site, indicating at the same time period the changes in the magnetic field angle for all sites and upon completion repeating the sequence at a second group of station sites.

Another object of the invention is to provide a means of automatically tracking minute changes in the magnetic field of the earth caused by the influence of the local telluric currents on the magnetic field angle, to thereby determine the mean direction of the telluric currents at individual tracking stations.

A further object of the invention is to provide a system for relatively rapid and thorough exploration of the surface of the earth above the substrata by preplanning the location of sites from aerial maps and delivering the tracking magnetometer by helicopter to the sites wherein data may be acquired either manually or automatically over a period of a few minutes.

A further object of the invention is to provide a method of geophysical prospecting which is independent of any connection with the earth or any traverse lines along the surface of the earth and requiring only triangulation with visible control points at higher elevations within sight of the station sites.

A further object of the invention is to provide a system or a method of geophysical prospecting from the bottom of a sea bed.

A further object of the invention is to provide a geomagnetic prospecting system utilizing magnetic field direction determining instruments and remote electronic means for adjusting the instruments to determine directional changes.

Other objects and a fuller understanding of the invention may be had by referring to the following description and claims, taken in conjunction with the accompanying drawing.

DESCRIPTION OF THE DRAWINGS

FIG. 1 is a plan view of an angle measuring means used in the prospecting system of the invention;

FIG. 2 is a side elevational view of the angle measuring means;

FIG. 3 is an end elevational view of the angle measuring means;

FIG. 8 is a plot of vectors according to the station sites of FIG. 7;

FIG. 16 is a diagrammatic showing of the vertical wheel determining the inclination angle changes;

FIG. 17 is a diagrammatic view of the horizontal plate determining the declination angle changes;

FIG. 18 is a graph of the magnetic field change vectors;

FIG. 19 is a graph of the telluric current change vectors.

DESCRIPTION OF THE PREFERRED EMBODIMENTS

Figure 4:
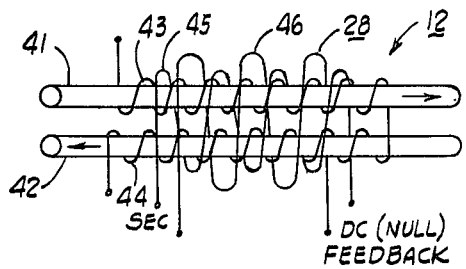
FIG. 4 is a schematic diagram of the electrical construction of the magnetic field detecting means.

FIGS. 1, 2, and 3 show the physical construction, somewhat simplified, of an angle measuring means 11 used in the prospecting system of the invention. FIG. 4 shows somewhat schematically the electrical construction of a magnetic detection unit 12 used in this angle measuring means. The angle measuring means 11 has an appearance somewhat similar to a surveyor's transit, and for portability might be mounted on a tripod 14 having a sub-base 15 with adjusting screws 16 adjusting the attitude of a base plate 17. The base plate carries a rotatable base 22. Supports 18 on the rotatable base 22 mount a trunnion 19 for the tiltable support of a telescope 20, as in the usual surveyor's instrument.

The rotatable base 22 may be rotated so that the telescope 20 may be directed along any desired azimuth. A worm 23 may be used for fine adjustment of the position of the rotatable base 22 and calibrated by a micrometer vernier 24 and may be readable by a scale magnifier 25 so that the azimuth may be set to within the desired accuracy, for example, five seconds of arc. The base plate 17 may be leveled by the adjusting screws 16, as shown, to be leveled by the bubble levels 26 and 27.

A vertical wheel 31 is journaled on the supports 18 and carries first and second magnetic detection units 12 and 13. These magnetic detection units are physically mounted perpendicularly to each other for a minimum of mutual inductance. The second magnetic detection unit 13 is adjusted by adjustment means 28 to have its axis perpendicular to the local magnetic inclination angle when the telescope 20 is horizontal, and the first magnetic detection unit is mounted to have its axis rotatable into any attitude in a vertical plane when this rotatable base 22 is horizontal. A scale 32 is provided on the vertical wheel 31. This wheel may be rotated by a worm 33 so that the scale 32 will indicate the vertical attitude and the scale may be read by a micrometer vernier 34 and a scale magnifier 35 to have the vertical inclination angle determinable to the desired accuracy, for example, five seconds of arc. Worms 23 and 33 are part of the adjustment means 28.

Each of the magnetic detection units 12 and 13 is electrically and physically identical, and only one is described and illustrated in FIG. 4. This magnetic detection unit 12 includes along an axis first and second cores 41 and 42, which preferably are high-permeability material. An excitation winding consists of coils 43 and 44 wound on the cores 41 and 42, respectively, so that when excited with an AC voltage at about 100 to 1000 Hertz, there is a nearly complete saturation of each of the cores 41 and 42. A secondary winding 45 is wound around both cores and both coils of the excitation winding. In the absence of an external magnetic field, the voltages induced in the secondary winding 45 from the two excitation coils are balanced, being equal and opposite, and hence produce no net EMF in the secondary winding 45. A feedback winding 46 is also wound on the two cores 41 and 42 and may be energized with a direct current to oppose the effect of any external field. Energization of this feedback winding may then be used to null the effect of such external field, or may be used as a null indicator. Since the two cores 41 and 42 are nearly completely saturated by the excitation current, when an external field flows through the cores 41 and 42 in a given direction, this tends to saturate one core more than the other, and hence a resultant voltage appears on a secondary having twice the frequency of the excitation voltage. This output voltage is therefore directly proportional to the axial component of the magnetic field, and inverts in phase when the field is reversed in direction. In one practical device constructed in accordance with the invention, the magnetic detection unit was quite sensitive and had an output of approximately one volt per Oersted. This is with 0.25 volts applied to the excitation windings 43, 44, and a current of 15 milliamperes.

The adjustment means 28 provided in the angle measuring means includes the worm screws 23 and 33, as well as the feedback winding 46. Each of these may be actuated to adjust the null of the field pattern of the magnetic detection unit 12 or 13 at null or close to null at a condition of high selectivity and sensitivity. The field pattern of an individual magnetic detection unit 12 or 13 is a figure eight pattern or, more accurately, a pattern of two contiguous spheres, with the axis of the figure eight or the axis joining the sphere centers coinciding with the axis of the cores 41 and 42.

Figure 5:
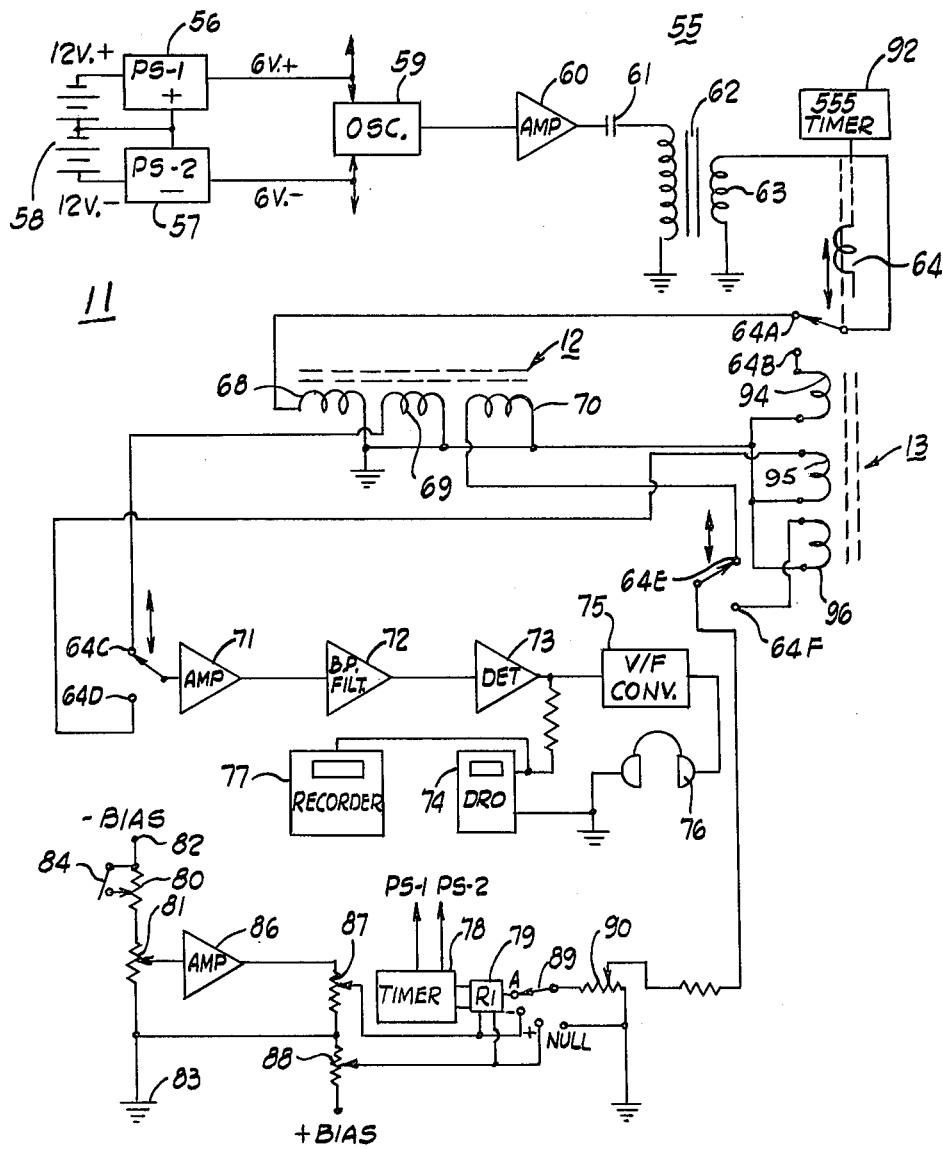
FIG. 5 is a schematic electrical diagram of the electrical circuit used with the angle measuring means.

The angle measuring means 11 may be considered a magnetometer, which is a modified null detecting multifluxgate arrangement. The schematic drawing of FIG. 5 shows the connection of the magnetic detection units 12 and 13, and each of these two fluxgate elements may be those commercially available from Smith Industries, Ltd. in Middlesex, England, as Type LFG-A 13. FIG. 5 shows the electronic circuit 55, which includes first and second power supplies 56 and 57 connected to supply a highly regulated, positive and negative supply voltage from batteries 58 to an oscillator 59. This oscillator 59 supplies a 1000 Hertz voltage to an amplifier 60, and, through a coupling capacitor 61, to an output transformer 62. The secondary 63 of the transformer 62 supplies the 1000 Hertz signal through a relay contact 64A of a relay 64, and then to the excitation winding 68 of the magnetic detection unit 12. This is like the two coils 43 and 44 of FIG. 4. The magnetic detection unit 12 also has a secondary winding 69 and a feedback winding 70. The secondary winding 69 is connected through a relay contact 64C to an amplifier 71, which amplifies the 2000 Hertz signal from this secondary. From here, it passes through a high Q band pass filter 72 and the output of the filter is rectified by a detector 73 which feeds directly to a digital readout 74 and an optional recorder 77, and also to a voltage-to-frequency converter 75, and from there to earphones 76.

The bias to the feedback winding 70 may be controlled by a timer 78 and changeover relay 79. Bias potentiometer 80 and heliopot 81 are connected in series between a negative power supply terminal 82 and ground 83. A switch 84 is connected to short-circuit the upper portion of the potentiometer 80 and the movable blade of the heliopot 81 is connected through an amplifier 86 to an output potentiometer 87. Another potentiometer 88 is connected to the positive power supply terminal. The movable blades of the potentiometers 87 and 88 are connected to the inputs of the changeover relay 79. A selector switch 89 is a four-position switch, and, when connected as shown in FIG. 5, is connected for automatic hunting from the output of the changeover relay 79. It also may be connected on negative or positive, or a null condition terminal. The selector switch leads to a potentiometer 90 which supplies the positive or negative DC bias through a relay contact 64E to the feedback winding 70.

The above-described electrical circuit may be duplicated for the second magnetic detection unit 13, although for economy of equipment and weight, the relay 64 may be provided and controlled by a timer 92. This may be a mechanical wind-up timer which alternates at intervals, for example, 20-second intervals, controlling the relay contacts. This relay 64 controls three single-pole, double-throw contacts, with the contacts 64A, 64C, and 64E already described in connection with supplying energy to the first magnetic detection unit 12.

When the relay 64 is in the opposite throw condition, then the relay energizes terminals 64B, 64D, and 64F to supply energy to the second magnetic detection unit 13.

In this condition, contact 64B will energize an excitation winding 94 on this magnetic detection unit, contact 64D will provide energy from a secondary winding 95 to the amplifier 71, and contact 64F will supply energy from the changeover relay 79 to a feedback winding 96.

Operation

Figure 7:
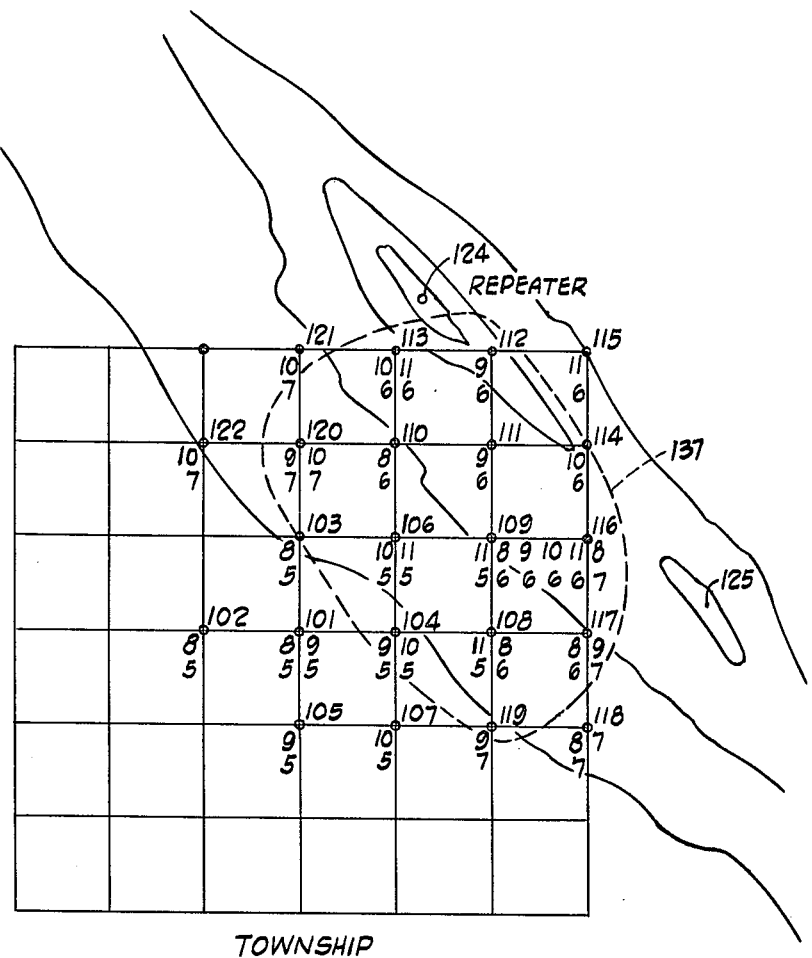
FIG. 7 is a plot of station sites used in the prospecting method.
Figure 9:
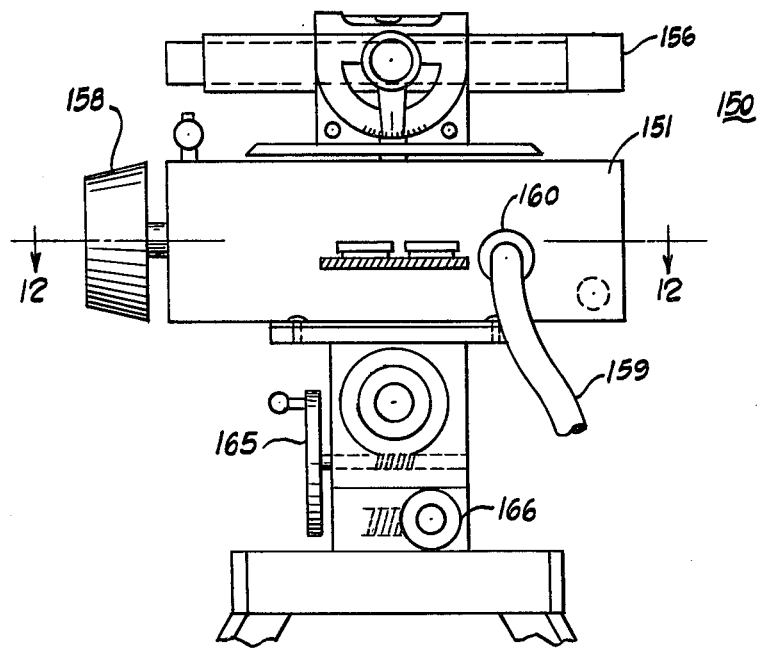
FIG. 9 is a side elevational view of a correlating monitor.
Figure 10:
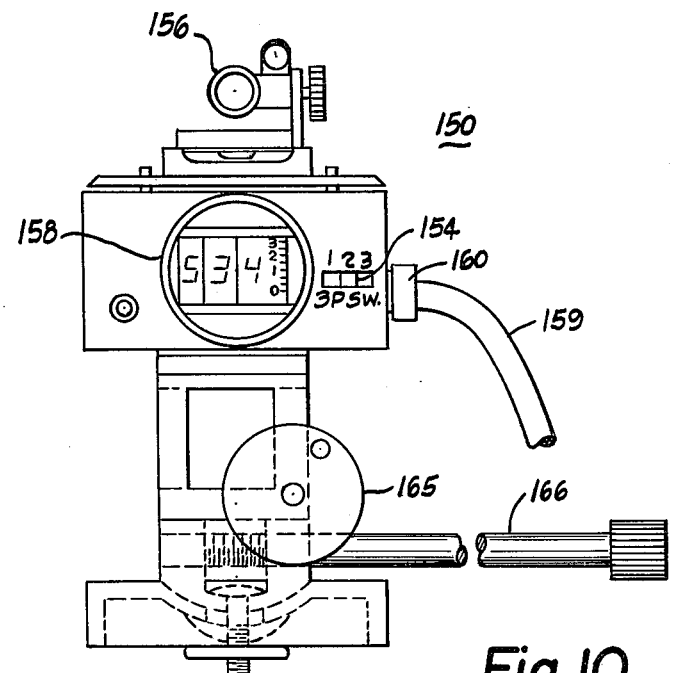
FIG. 10 is an end view of the monitor of FIG. 9.
Figure 11:
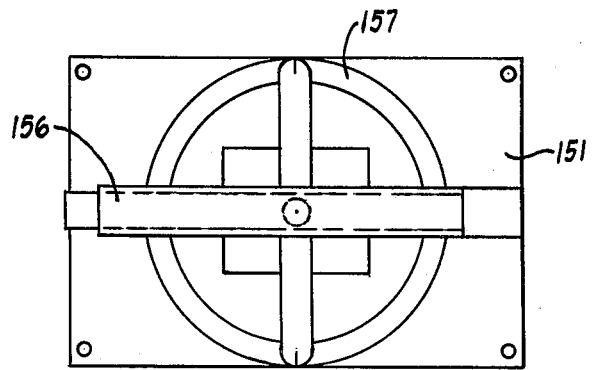
FIG. 11 is a plan view of the monitor of FIG. 9.
Figure 12:
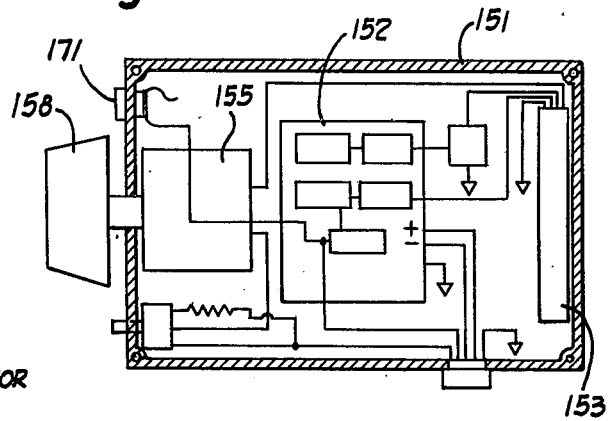
FIG. 12 is a sectional view on the line 12—12 of FIG. 9.

FIG. 7 is a plan of a grid superimposed on a map of an area, for example, a township. Station site 101 is selected at a suitable location to be explored by the geomagnetic prospecting system 98 of the present invention, which includes one or more of the angle measuring means 11 shown in FIGS. 1-3. The center of the township at station site 101 may often have a bench mark for accurate location of this station site relative to available maps. A high point 124 is chosen, preferably within line of sight distance from the first station site 101, and a portable radio repeater and flag or reflector is established at this high point by any means, such as a four-wheel drive vehicle or helicopter. This permits communication to be maintained at the various lower elevations. In this preferred embodiment, the geomagnetic prospecting system 98 preferably includes a plurality of station sites, such as 101, 102, and 103, to be equipped with angle measuring means 11 and to be manned before a time of day about one to one-and-one-half hours after sunrise. If sunrise is at 6:00 A.M., then by about 7:30 A.M. the telluric currents are changing rapidly. This diurnal change in current is at about a maximum from 7:30 or 8:00 A.M. until about 11:00 A.M., and then the change slows and at about noon changes to the opposite direction in the afternoon until sunset. Each station site will be equipped with a radio transmitter and receiver to be repeated by the repeater site 124 to each of the other station sites. One of the station sites is chosen as a control site, and station 101 may be so chosen for the first reading, which might be, for example, at 8:00 A.M. These will be synchronized by the radio communication.

Figure 15:
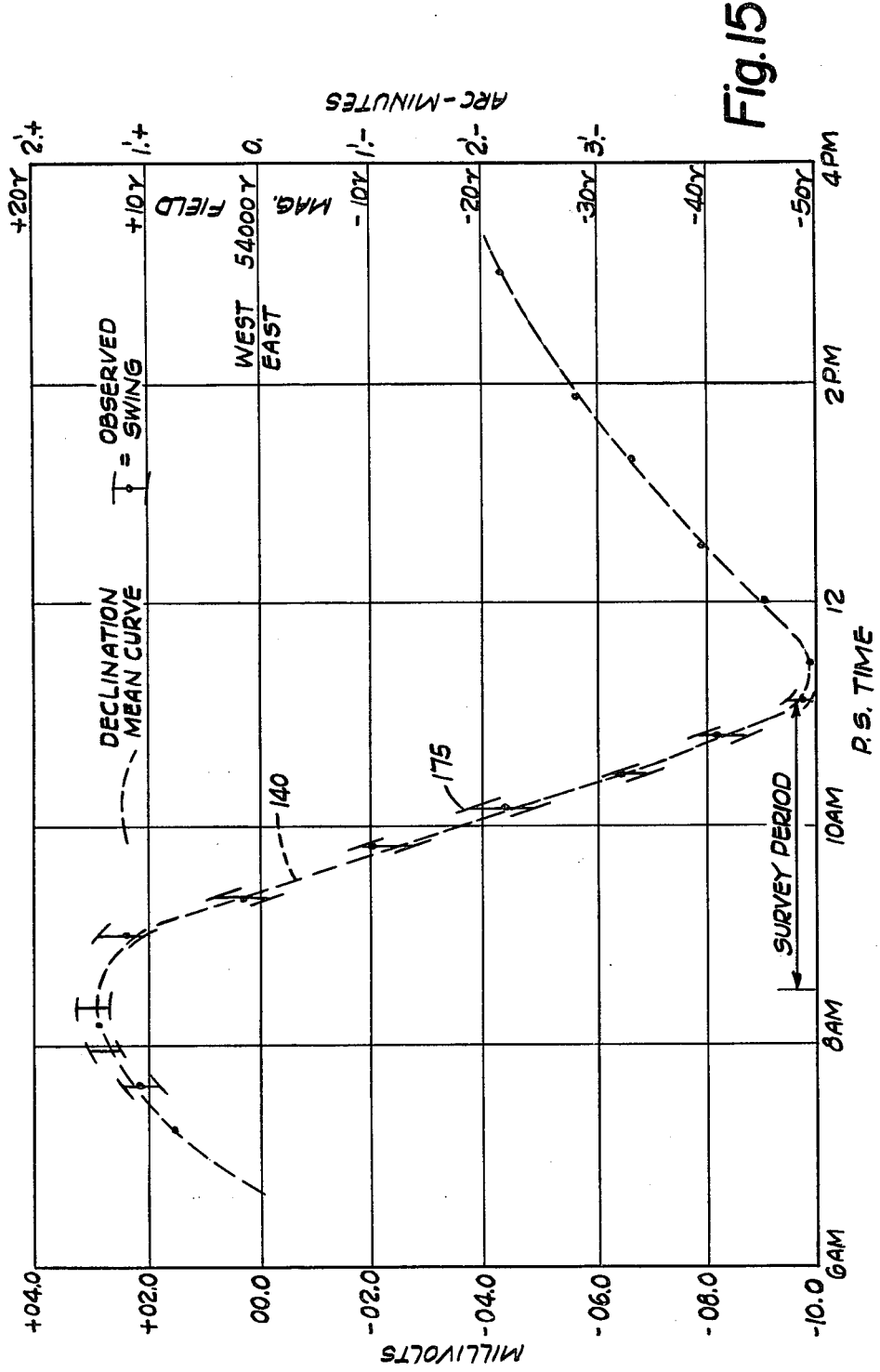
FIG. 15 is a graph of the diurnal magnetic declination changes.
Figure 20:
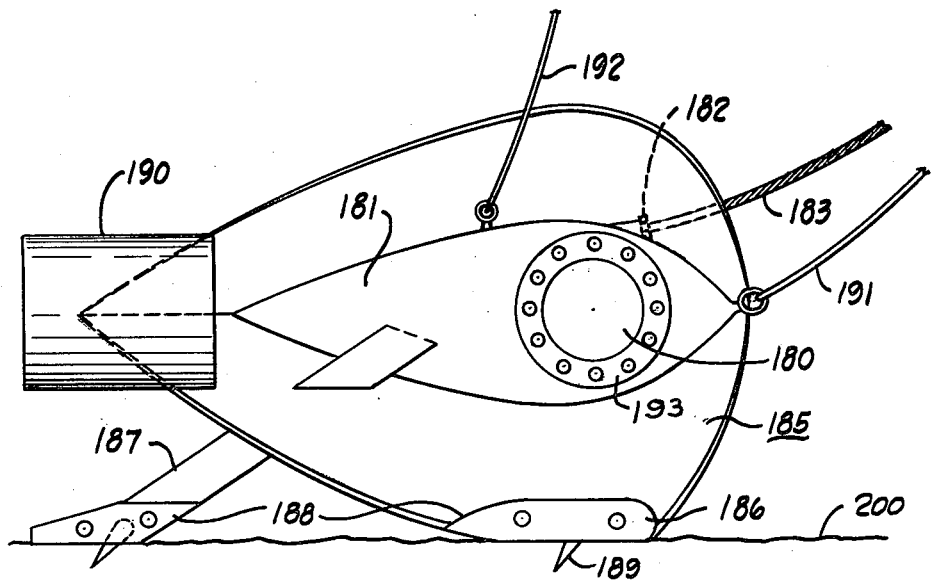
FIG. 20 is a side view of a submarine prospecting vehicle.
Figure 21:
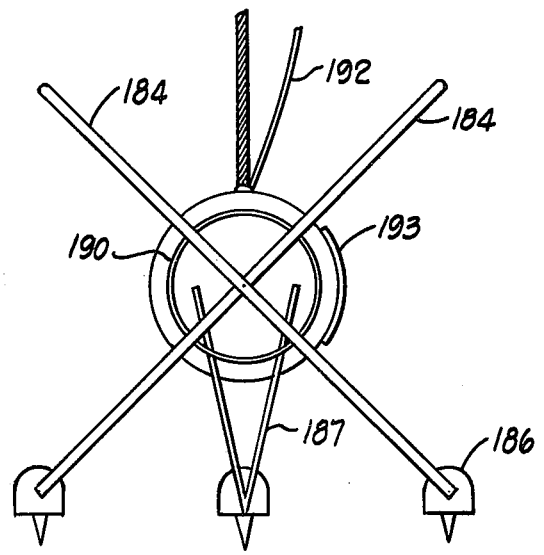
FIG. 21 is a rear view of the vehicle of FIG. 20.

FIG. 15 is a graph of the diurnal magnetic declination changes. These diurnal changes are due to the diurnal telluric current changes, caused by the apparent movement of the sun relative to the earth. This diurnal magnetic declination change curve 140 is the main curve of the declination angle, as measured, about every half-hour. It shows that initially at sunrise until about 8:00 A.M., the declination angle changes in a positive direction, and from then on until about noon, the declination angle reverses to have a change in the negative direction. About noon, this curve reverses again to have a change again in the positive direction. This curve 140 is plotted from an actual instrument according to the present invention, and this curve changes as the season changes, as well as with latitude and longitudinal changes of the station site. This particular curve was made at Vancouver, British Columbia, on May 3, 1980, which was three days after the full moon. This location is 123 degrees west longitude and 49 degrees, 15 minutes north latitude. The magnetic declination is 23 degrees east, namely, magnetic north is 23 degrees east of true north. This data is important primarily to correlate the magnetic readings obtained by the instruments of the present invention with a map for survey purposes.

The radio repeater and flag or reflector are utilized for triangulation of each station site, along with any other high points or sites that have flags or reflectors, such as high point 125. The various station sites may all be predetermined from detail aero maps, and are used as references throughout the survey. Each evacuated site is left with a flag and stake so that in the event that a more detailed resurvey is desired, the site will be a reference for comparing conditions.

Each operator at a station site mans the angle measuring means 11 at his station site. The tripod 14 is set up over the flag stake, with the sub-base 15 approximately level. Then, the adjusting screws 16 are manually rotated to make the base plate 17 level according to the bubble levels 26 and 27. This base plate may be leveled within five seconds of arc on a good quality instrument.

Next, the operator may use a telescope to sight the repeater site 124, high point 125, and the other station sites, if visible, for triangulation purposes and to correlate positions with the available maps.

The batteries 58 may be placed on the ground near the tripod 14, and the electronic circuit 55 may be mounted in a housing secured to a leg of the tripod 14, with the digital readout 74 visible at the top of the housing.

Next, the electronic circuit 55 may be energized, with the oscillator 59 supplying a low frequency signal, for example, 1000 Hertz, which is supplied to the excitation winding 68 of the first magnetic detection unit 12. This is sensitive to the position of the vertical wheel 31 and, hence, has a null in the magnetic field pattern which is a null between two contiguous spheres coaxial with the cores 41,42 of this magnetic detection unit. Accordingly, when the dip needle angle of inclination for that particular latitude of the station site 101 is 70 degrees/30 minutes, for example, then the angle of the core 41,42 will be 19 degrees/30 minutes relative to the horizontal when the null of the magnetic detection unit 12 is on this dip needle inclination angle. Such angle may be accurately established by the worm 33 to adjust the position of the vertical wheel 31. With the electronic circuit 55 energized, 1000 Hertz is applied to the excitation winding 68 and, since this nearly saturates the core 41,42, this establishes a double frequency or 2000 Hertz signal in the secondary 69 directly proportional to the strength of the magnetic field of the earth. The headphones 76 will give an audible indication of this 2000 Hertz signal and permit quick adjusting of the instrument to this null condition.

Next, the relay 64 may be switched to the opposite throw condition for adjustment of the second magnetic detection unit 13. This unit is horizontal when the base plate 17 is horizontal, so the adjustment of the worm 23 rotates the rotatable base 22 so that the core of the magnetic detection unit 13 is east to west for a null directed toward magnetic north. The horizontal declination is indicated by this second magnetic detection unit 13 and magnetic charts are available which show the declination for various places on the surface of the earth, for example, in the western United States, the declination of magnetic north is to the east of true north. For example, it might be 11 degrees east of true north at a particular location in a western state. All declination readings are taken with respect to magnetic north as a reference point, and may be changed to be with respect to true north if needed to correlate a position of a station site with a map. The null condition may be indicated quickly by the headphones 76, as previously mentioned, or the lowest reading on the digital readout 74 will indicate the null condition.

The timer 92 may have 20-second intervals of actuating the relay contacts 64A-64F, so that initially the first magnetic detection unit 12 is energized and then, twenty seconds later, the second magnetic detection unit 13 is energized. This is for economy of equipment and weight to be carried with the portable instrument, because it saves duplicating the parts 71-77.

The adjusting means 28 includes not only the worms 23 and 33, but also the feedback windings 70 and 96. Sufficient DC current of the correct sign may be applied to the respective feedback windings to nullify any small amount of magnetic flux from the field of the earth in the core 41,42. Thus, either mechanical or electrical adjusting means may be used to null the instrument for both vertical inclination and horizontal declination.

Figure 6:
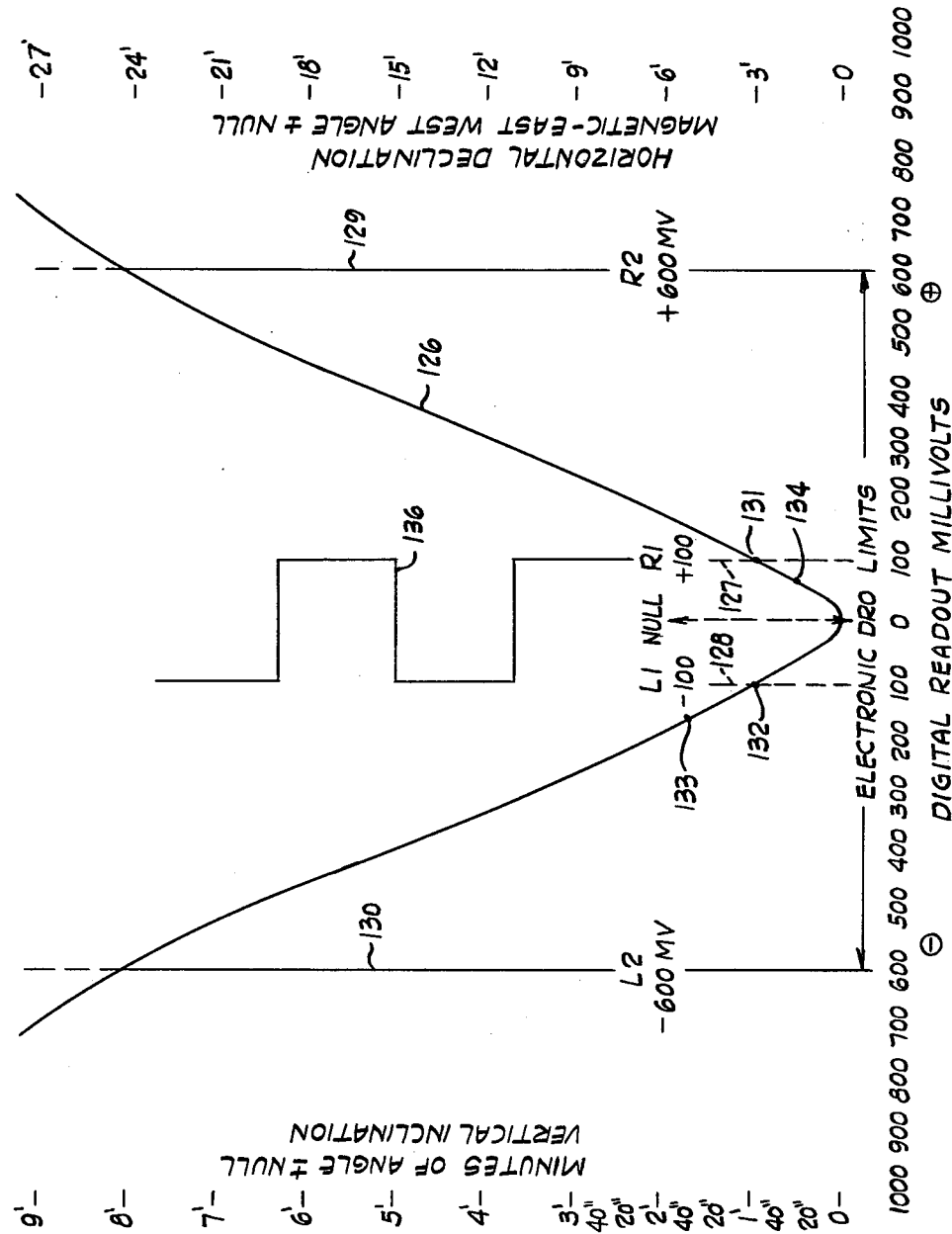
FIG. 6 is a graph of selectivity of the angle measuring means.

FIG. 6 shows a graph of the selectivity of the magnetic detection unit 12 or 13, and curve 126 is a curve of the magnetic vertical inclination plotted against millivolts on the output, for example, on the digital readout 74. This vertical inclination may be considered a change along a north-south line. The magnetic vertical inclination angle or north-south quadrants are plotted on the left side of FIG. 6, and the magnetic east-west horizontal declination is plotted on the right side of this FIG. 6, again relative to the same millivolt output to the digital readout 74. The bias switch 84, when closed, is for coarse adjustment of the bias and, when open, is for vernier adjustment of the bias by the heliopot 81. The small negative or positive bias from the changeover relay 79, for example, may be 100 millivolts±, as shown by the boundary lines 127 and 128. Practical limits of larger positive and negative bias supplied to the feedback winding 70 or 96 by the changeover relay 79, for example, may be 600 millivolts± in one instrument made in accordance with the invention. This is shown by the boundary lines 129 and 130 on FIG. 6. When the particular magnetic detection unit is perfectly nulled, the equal but opposite currents will cancel, such as at points 131 and 132. However, if, for example a north negative bias produced 150 millivolts negative at a point 133 and the south bias produced 50 millivolts positive at a point 134, the differential would be 100 millivolts minus, or approximately one minute of arc off a true null to the north. This placing of the bias on the core 41,42 makes the instrument more sensitive to angular changes in the magnetic field of the earth, and makes them more readily determinable from the gradients on each side of the null than to have the instrument adjusted right on the actual null. The changeover relay 79, when it is actuated by timer 78, produces the curve 136 diagrammatically indicated on FIG. 6, to alternate between the positive and negative biases. This alternate selection of positive and negative bias potentials thereby brackets the null with alternate readings. The gradual changes in the readings with the diurnal changes then become more readily apparent. This alternate selection of the bias feedback constitutes a hunting process providing fast sampling of the amount and direction of any small changes in the direction of the magnetic field of the earth. This renders the data acquisition input much more quickly than accomplished by the prior art.

The above description also applies to the east-west half of the direction finding magnetometer, which in practice periodically alternates sampling periods with the north-south half of the instrument, as determined by the timer 92. It requires a larger arc of movement of the horizontal plate 22 than of the vertical wheel 31 to obtain the same voltage readout, e.g., 100 millivolts, as shown by the two different scales on the two different sides of FIG. 6. This is due to the horizontal rotation of the rotatable base 22 being approximately 70 degrees off a true null position in the northern United States. One hundred millivolts of change is approximately equal to one minute of arc on the north-south inclination null, but equal approximately to 3 minutes on an east-west declination arc.

After the three angle measuring means 11 are set up at the three station sites 101, 102, and 103 and properly nulled, or preferably just off-null onto a sensitive part of the selectivity curve 126, then all three sites are ready for operation. The first reading should be coordinated by radio communication via the radio repeater 124, with readings coordinated at all three sites with respect to time. This might be at 8:00 A.M., for example. Each operator watches the digital readout 74 for approximately five to ten minutes of time and notes the changes in the inclination and declination readings. At the end of this ten-minute period, the readings are recorded and also reported by radio to the chief operator at station 101. Table 1 shows the changes in the inclination and declination for each of the three station sites.

TABLE I

| Station | Inclination Change | Declination Change |
|---|---|---|
| 101 | −1'00" | +4'10" |
| 102 | +1'10" | +4'00" |
| 103 | −1'10" | −3'30" |
| 104 | −2'20" | −5'20" |
| 105 | +1'10" | +3'30" |

Table 1 is created to produce telluric current directions and, as the angles are magnetic, it is necessary to rotate the quadrants 90 degrees clockwise in order to represent the current directivity, thereby showing the inclination E-W and declination N-S.

FIGS. 16-19 better illustrate these changes in inclination and declination angles and their plotting as signal vectors. FIGS. 16 and 17 are rather diagrammatic illustrations of the vertical wheel and horizontal plate to determine the inclination and declination angles, respectively. It is assumed that FIG. 16 represents the vertical wheel 31 as it is initially set up during the first time period and established on a null, or preferably just off the null, of the sensitivity curve 126 of FIG. 6. If a short time later, five or ten minutes later for example, the magnetic field of the earth shifts slightly counterclockwise to a position as shown by the flux line 142; then this flux will thread the core of the first magnetic detection unit 12 and give a digital readout which is changing in the negative direction. This means that the vertical wheel 31 would need to be mechanically moved slightly counterclockwise, as shown by the arrow 143, to rebalance the first magnetic detection unit 12 or, preferably, this rebalancing would be accomplished electronically. This would be by changing the bias on the feedback winding 96.

Also at the end of this ten-minute period, the horizontal component of the magnetic field of the earth could have changed to be as shown by the flux line 144 on the second magnetic detection unit 13 as shown in FIG. 17. This changed flux would thread through the core of this detection unit 13, and the horizontal plate 22 would need to be rotated slightly counterclockwise, as shown by the arrow 145, to rebalance this detection unit 13. Again, if any rebalance is accomplished, this is preferably accomplished electronically by changing the bias on the feedback winding 70. This changed magnetic field of the earth, as shown by flux line 144, would establish a negative change in the declination reading, and this is in agreement with a surveyor's angle change, which is negative, i.e., the angle is becoming smaller.

FIG. 18 is a graph of signal vectors which are magnetic change vectors and the change vector 103M is plotted on this FIG. 18 from the data in the Table 1. The inclination has changed negatively, i.e., more toward the north direction, and the horizontal declination has changed toward the west, which has been designated negative. On FIG. 18, this makes this vector 103M upwardly to the left. In oil and gas field prospecting, telluric current vectors are more usually used rather than magnetic field vectors.

Accordingly, FIG. 19 illustrates the change from FIG. 18 to show the signal vectors as telluric current change vectors rather than as magnetic change vectors. Since these two phenomena are perpendicularly related to each other, the telluric change vectors may be rotated counterclockwise; however, FIG. 19 shows everything within the compass rose circle 146 rotated 90 degrees clockwise relative to that in FIG. 18. This makes the current vector 103C, shown in FIG. 19, in the first quadrant, which is established by negative inclination angle changes and negative declination angle changes.

Since the magnetic declination detection unit 13 produces a larger digital readout in millivolts than the magnetic vertical inclination change, the scale markings of the declination changes on both FIGS. 18 and 19 are arbitrarily multiplied by 3. This more nearly equalizes the length of the inclination and declination change components, which establish the signal vectors, either magnetic change vectors or current change vectors.

When both inclination and declination changes are negative, this makes the change telluric vector in the first quadrant, as shown in FIG. 19. When such change vector is in the first quadrant, this indicates the presence of hydrocarbon in the substrata. More specifically, when this and associated vectors are at 55 degrees east of north, ±30 degrees, then this is an anomalous angle range shown by arc 148 in FIG. 19 and indicates the presence of hydrocarbon in the substrata.

The stations 101, 102, and 103 are shown as having vectors which are plotted on FIG. 8, and also on FIG. 19. Upon a comparison of the readings, the only one of interest is from site 103, since it has a vector in the first quadrant. Normally, this would become the control site for the next readout, for example, at 9:00 A.M. However, since the start of the survey is at the center of the township, it is often better to complete the surrounding readouts, with control remaining at the center of the township. Therefore, the station site 101 remains in control for the 9:00 A.M. reading and station sites 104 and 105 are shown also as being set up for the 9:00 A.M. readout. The notation on FIG. 7 indicates the station site number and below it, to the left, is the time of day, and below that number is the day of the month. Hence, stations 101, 102, and 103 show that there was a reading at 8:00 A.M. on the 5th of the month. For the 9:00 A.M. readout, stations 101, 104, and 105 were used and the readings are shown on Table 1. The vectors are plotted on FIG. 8, and this shows that the readings indicate an anomaly at station site 104, whereas, the readings at station sites 101 and 105 were random, and hence an indication of no hydrocarbons. Therefore, station site 104 was chosen as the control site for the 10:00 A.M. readout with station sites 106 and 107. The readout from station site 106 indicated an anomaly, so this was chosen as the control site for the 11:00 A.M. readout. Also at this 11:00 A.M. readout, station sites 108 and 109 were used, and the vectors plotted on FIG. 8 show an anomaly at these station sites as well. Further, a vector in the first quadrant at two adjacent control sites indicates the presence of hydrocarbons in the substrata in a location below and between such two station sites.

The second day on the 6th of the month, at the 8:00 A.M. readout, both station sites 108 and 109 were chosen as overlapping control sites from the previous day in order to better correlate one day's reading with the next day's reading. The new station site was 110. This use of two station sites overlapping from the previous day is done in case one site is on the edge of the anomaly and is at variance with the anomaly to perhaps give a random reading on the second day.

Station site 109 became the control site for the 9:00 A.M. and 10:00 A.M. readings, with station sites 111 and 112 being the relocated station sites on the 9:00 A.M. readout, and station sites 113 and 114 being the relocated station sites on the 10:00 A.M. readout. Station site 113 became the control site for the 11:00 A.M. readout, with station sites 115 and 116 being the relocated station sites at that 11:00 A.M. reading. This ended the second day's operation.

The remaining sequence of selecting station sites is self-explanatory. This procedure reduced the time and cost of locating the anomalous area under the township by more than fifty per cent over the prior art method of following a traverse.

FIG. 8 shows the various vectors and station 101 has two vectors, for example, which are indicative of the two vectors by the readings at 8:00 A.M. and 9:00 A.M. on the fifth day of the month. Station site 104 has two vectors which are both in the first quadrant and correlate quite well, and these are the two vectors obtained from the readings at 9:00 A.M. and 10:00 A.M. on the fifth day of the month. Thus, this overlap of two readings at two different times is a correlating means to correlate the readings at 9:00 A.M. with those at 10:00 A.M. Since the vectors at station site 104 are quite similar to each other, this shows that there is a high degree of correlation, whereas, the two vectors at station site 101 are in different quadrants, and hence show that these are random vectors which indicate the absence of any significant hydrocarbon anomaly in the substrata.

Another correlating means is to make a continuous recording of the horizontal declination reading at one particular site, for example, station site 104. It has been found that the change in the declination readings gives a good indication of the diurnal change in the telluric current. Therefore, if there are any sunspots or other solar flares, which can affect the telluric current, this recording of a declination will give such indication of intense solar activity, and hence that particular set of readings may be discarded as untrustworthy. In this case, the readings would be taken over again for that group of station sites at a later time when there was rather normal solar activity.

This second type of correlating means may be the second magnetic detection unit 13 in one of the angle measuring means, or may be a declination monitor 150, as shown in FIGS. 9-14. This monitor may have a case 151, e.g., made from cast aluminum. The circuit board 152 may carry the electronic components similar to the declination angle components 80-96, as shown on FIG. 5. The case 151 would also carry the fluxgate element 153 similar to the magnetic detection unit 13. A switch 154 is a three-position switch similar to switch 89 and sets the bias to a heliopot 155 for zero null vernier balance, and coarse balance.

A sliding telescope 156 pivots vertically on a horizontal axis, and in practice only about 20 degrees arc of movement is used. This telescope also pivots horizontally about a vertical axis throughout a full 360 degrees, as shown by a scale 157 in FIG. 11. The heliopot 155 has a feedback control dial 158 which provides 100 divisions per revolution, plus a vernier 10-division scale. A total of 10,000 divisions are readable over the resistance range of the heliopot 155.

Figure 13:
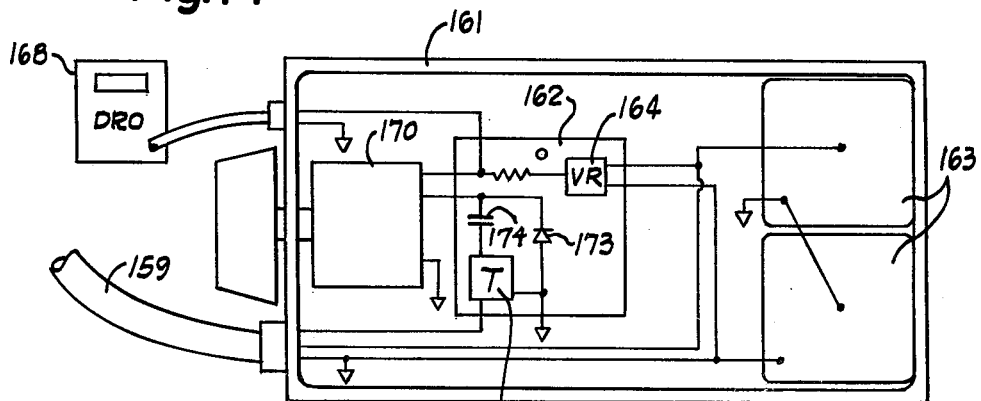
FIG. 13 is a sectional view of the power supply used with the monitor of FIG. 9.

A six-wire cable 159 connects the case 151 at the connector 160 and carries the battery voltage from the power supply unit 161 shown in FIG. 13. This cable also carries the fluxgate output to a signal level detector 162 in the power supply unit. The batterie's 163 supply an operating voltage to a voltage regulator 164 to power the monitor. Worm drives 165 and 166 control the vertical and horizontal settings, respectively, of the monitor 150.

Figure 14:
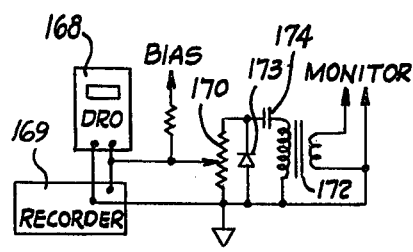
FIG. 14 is a schematic diagram of the circuit of the monitor.

The electrical circuit is quite similar to the lower two-thirds of the circuit shown in FIG. 5, which circuit also determines the horizontal declination angle. A digital readout D.C. millivolt meter 168 is similar to the digital readout 74 in FIG. 5, and a recorder 169 similar to recorder 77 is also optionally provided. A bias control heliopot 170 is used, similar to the potentiometer 81 in FIG. 5. FIG. 14 illustrates a portion of the circuit contained in the power supply unit 161 and the signal from the declination monitor 150 is supplied to a transformer 172 and a capacitor 174 to a detector 173, which is similar to the detector 73 in FIG. 5. From here, the detected signal passes through the bias control heliopot 170 to the digital readout 168 and optional recorder 169. During the setup procedure, which may be similar to that for FIG. 5, earphones 76 can be plugged into a jack 171 to determine the null. Preferably, the declination monitor 150 is set off null, for example, at a point such as point 133 on the curve 126 of FIG. 6. In so doing, the declination monitor will be at a quite sensitive portion of the curve 126, and also the digital readout will move in either a positive or a negative direction as the total magnetic field of the earth changes slightly due to diurnal changes in the telluric current.

FIG. 15 is a curve produced from the declination monitor 150 and this magnetic diurnal curve 140 is a mean value established by the mean between random swing variations 175 over a few-minute time period. The sensitivity of the instrument may be observed on FIG. 15 by noting that one minute of arc is equal to two millivolts of readout. The digital readout 168 goes to 0.01 millivolts, which is 0.3 of one second of arc. With this high sensitivity, the small changes in the magnetic declination angle may be readily observed in a short time period of two to ten minutes.

During the early morning as the sun is rising, the diurnal change in the telluric currents means that the telluric currents are increasing. This results in the magnetic declination changing by rotating counterclockwise, whereas, the vertical inclination is more subject to the substrata influence, including any hydrocarbons in the substrata. The continuous recording of the horizontal declination will reveal if there is any reversal or bump in the morning diurnal gradient due to solar activity, and, if so, then the magnetic horizontal declination becomes clockwise, which indicates adverse conditions, and all such readings are invalidated. A radio receiver set on WWV of the Bureau of Standards station at Denver, Colo. carries hourly updates on the solar indices. These may be used to check on solar activity.

It has been found that, with the sensitive instrument illustrated in FIGS. 1-5, it is possible, during the morning hours from 8:00 A.M. to 11:00 A.M., to recognize a favorable or unfavorable trend in the horizontal declination changes in a period of two minutes, and in the inclination changes in a period of five to ten minutes. In a recent geomagnetic survey, all telluric intensity changes manifested themselves in minute alterations of the magnetic field angle. These diurnal variations during the morning were favorable 80% of the time, and generally the unfavorable periods came in time groups caused by intense solar activity, and therefore were less detrimental to the average survey day. Briefly, one day in ten could be unfavorable. I therefore have found that the direction of the recorded vectors shown in FIG. 8 on sites over hydrocarbon anomalies is quite consistent, and the length of the magnetic vector varies with telluric current amplitude. It is to maintain amplitude control that one prefers continuity in readings, or at least correlation between readings, by overlapping of a control site between readings at two different times. The direction of a vector, however, is the real indicator of the hydrocarbon anomaly, both in singular station sites and in locations between two such adjacent station sites. It will be noted in FIG. 8 that a field line 137 may be drawn around all those station sites which have vectors in the first quadrant, and this field line indicates the presence of a hydrocarbon field in the substrata below these station sites. When the diurnal changes in the telluric current cause the telluric current to change rapidly, as between 9:00 and 11:00 A.M. on FIG. 15, then this rapid change proportionately affects both the north-south and east-west vector components. Thus, the angle of the vector in FIG. 8 remains approximately constant, but the length of the vector increases. This knowledge permits new approaches to detecting hydrocarbon anomalies compared with the prior art systems. First, a traverse line is unnecessary and, instead, one may move around to randomly selected station sites as the readings of the instruments indicate favorable or unfavorable results. Second, an A.M. to P.M. comparison is unnecessary, and third, a fixed monitor is unnecessary, each station site giving a reading which is a definite indication of the presence or absence of a hydrocarbon anomaly, independent of any other reading at a different station site or at a different time at the same site. Fourth, the immediate on-site interpretation of the data permits the survey to become a continuous hydrocarbon search exploration tool, with progressive control site values. This is illustrated by FIGS. 7 and 8, where the selection of the station sites was not made beforehand, but instead was done in random directions as the prospecting search progressed. Fifth, instead of being limited to a block of station sites, the survey becomes a fast, true oil-gas exploration tool. This procedure is, of course, not limited to hydrocarbon anomalies because the opposite sign of vector or group of vectors into the third quadrant would indicate the presence of a form of a geothermal anomaly in the substrata.

A review of FIGS. 7 and 8 will illustrate that merely watching the digital readout 74 for a period of two to ten minutes at station site 106, for example, will indicate a negative reading for both the north-to-south vertical inclination change and the west-to-east horizontal declination change during that period of time. These two negative readings, when plotted as a vector on FIG. 8, will result in a telluric change vector in the first quadrant. Therefore, the angle measuring means 11 as a single instrument at the station site 106 may be used to indicate the presence of a hydrocarbon anomaly beneath that station site. Also, the presence of vectors in the first quadrant for both station sites 104 and 106 indicates the presence of a hydrocarbon anomaly beneath the surface of the earth between these two station sites. The existence of the vectors in the first quadrant for all the station sites within the field line 137 indicates the presence of a hydrocarbon field below the surface of the earth at the area of these station sites.

The various station sites may have the angle measuring means delivered by helicopter and set up by an operator to be on a null condition, or very close to a null condition, whereat the instrument is quite sensitive. Then, if the operator remains at that site, by radio instructions he may turn on the instrument for indicating or recording, or both, of the data at a preset time. This would be concurrently with all other station sites in a first group of station sites. Alternatively, radio control may be used to remotely turn on such electronic circuit 55 rather than to rely on the operator at each particular station site to turn on and off such electronic circuit.

The various station sites may readily be established and located relative to a map merely by triangulation with visible high points on the surroundings, such as high points 124 and 125. This accurately locates each station site on a map and permits ready relocation of such station site should a more detailed survey be required. Also, this eliminates the need of establishing a particular traverse line, for example, a traverse line from west to east, as was often required in the prior art systems.

The new method of geophysical exploration eliminates the need for carrying this azimuth or working line along the traverse, thus permitting greater exploration flexibility. Each site is independent and renders a reading as to the direction of the telluric current, and more importantly the changes in such direction.

Another advantage of the present invention is that an operator is not required to physically touch or reset the angle measuring means to a null or zero to observe the angular change in telluric current, because this now may be accomplished electronically by the feedback windings 70 or 96. Another advantage is that the instrument is highly sensitive, yet the manual operator may stand a distance away from the angle measuring means 11 to observe the large digital readout 74 on the tripod leg. Therefore, the sensitive instrument readout is not influenced by any local movement of the ground or from any numerous interfering articles, such as sunglasses, keys, pens, belt buckles, etc.

In a sequential procedure of setting up a given number of station sites within a time frame to obtain substantially simultaneous recordings over several minutes during a time period satisfactory to the control location, there are several things to consider. The early morning conditions are inactive until full sunrise, when the diurnal change in telluric current begins to occur. Advantage may be taken of this early morning period for setting up several station sites so that the first area recording or printout from these stations may be obtained approximately one hour after sunrise. The removal of these angle measuring means at all but one station site to a new set of prearranged sites by helicopter may take a half hour or an hour before a second area printout or readout is obtained. The latest group of station sites at which readings are taken should be concluded about one hour before noon, because at noon the diurnal changes in the telluric current reverse. New station sites may then be located in the afternoon for the next day's work. In this manner, a random grid may be spread over areas that show the most favorable results. It is preferable to have one station site that is not moved between two adjacent time periods of readouts. This provides a correlation between successive readings by maintaining an overlapping readout at the control station site for interpretation continuity and effective monitoring purposes. The spacing between station sites depends upon the detail required. A detailed survey would be at an average of 2000 feet between station sites in the average oil patch; however, for initial exploration, the differences can be one mile spacing between stations for hydrocarbon anomaly depths below 2000 feet. Greater spacing without triangulation on high points is quite practical for random exploration with orientation of the station site merely by a map.

FIGS. 7 and 8 show that on the surface of the earth the field line 137 gives the boundary of a hydrocarbon anomaly below the surface of the earth. This is marked by the consistency of the telluric change vectors all being in the first quadrant. The presence of such subsurface hydrocarbons produces a directional telluric current anomalous zone which has a pattern and consistency unlike any other geophysical anomaly. It is the random directional inconsistency of the earth's currents which forms the background at station sites outside of the boundary field line 137, and therefore these inconsistent vector directions form the contrast to the consistent vector directions, indicating a hydrocarbon anomaly. It is this hydrocarbon influence on the telluric currents being consistent in producing a characteristic directional pattern which is easily identified, which makes permissible random site locations for explorations. This is in contradistinction to the prior art systems, which required a traverse line and required a traverse once in the morning and once in the afternoon in order to give interpretable results as to the existence or nonexistence of a hydrocarbon substrata. The present geophysical survey system permits expanding the survey in any favorable direction in steps. This survey is practical, rapid, and particularly economical. These are some of the many advantages of not being required to make an afternoon differential reading and being able to leave the site with complete and meaningful data.

The timer 92, having about a 20-second interval, is a means to indicate substantially simultaneously on the digital readout 74 or recorder 77 both the inclination and declination angles for a given station site. If the recorder 77 is connected to the output of a detector 73, then it is easy to observe from the recording paper the changeover from the inclination to the declination, and vice versa, and to observe any gradual changes in the inclination or in the declination.

The angle measuring means 11 is a station instrument which may be set up at different station sites relative to the surface of the earth, and such station instrument includes first and second magnetic field detecting means 12 and 13. The first detecting means 12 is adapted to be set up to detect a null in a first plane, which plane includes substantially the dip needle angle of inclination for that latitude. This first plane in the preferred embodiment is a vertical plane. The second magnetic field detecting means 13 is fixed on the instrument to be perpendicular to the first magnetic field detecting means 12, and also may be rotated to establish a substantial null of the signal output therefrom, due to the magnetic field of the earth.

The invention further contemplates use of the angle measuring means in an underwater environment. This is shown in FIGS. 20–23. The angle measuring means 11 may be the same as shown in FIGS. 1, 2, and 3, but without necessity for the telescope 20 or tripod 14. This angle measuring means 11 includes the vertical inclination angle magnetic detection unit 12 and the horizontal declination angle magnetic detection unit 13. These two detection units, for example on the sub-base 15, are mounted inside a watertight spherical instrument chamber 180. This chamber is mounted inside a streamlined fairing 181 and a remote cable connection 182 is provided on the outside of the fairing 181 connected to the instrument 11 in the chamber 180 and to which a control cable 183 may be connected. The fairing 181 is provided with two vanes 184 so as to provide a submarine vehicle 185. This vehicle provides a stable platform for the angle measuring means 11 by providing weights 186 at the bottom of the vanes 184 and on a tail strut 187 so as to form a tripod 188. Retractible prods 189 are provided on the bottom of the tripod to eliminate sideways drift in a soft sea bottom. The tripod provides a stable platform support when the submarine vehicle 186 is resting on the sea bed. A cylindrical tail vane 190, together with the vanes 184, provide directional stability when the vehicle 185 is towed in a forward direction by means of a towline 191. A lift line 192 is also connected above the center of the mass so that the vehicle 185 may be lifted while remaining in a generally horizontal attitude. An access door 193 may be provided in the instrument chamber 180 for access to the angle measuring means 11. The construction of the submarine vehicle 185 is from nonmagnetic material so as not to disturb the magnetic angle measuring means 11 within the chamber 180.

Figure 22:
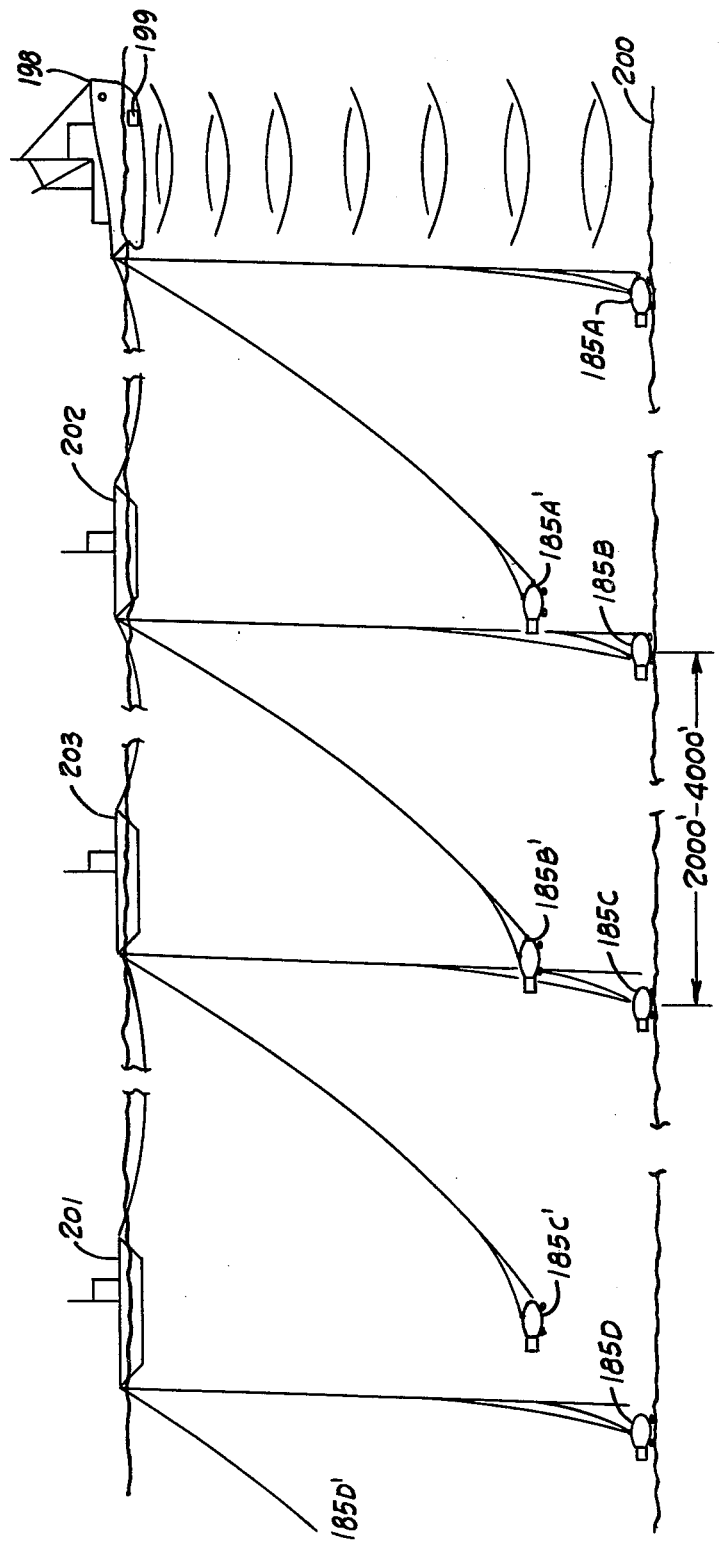
FIG. 22 is a side elevational view of a prospecting system utilizing surface vessels and submarine vessels.

FIG. 22 shows apparatus for utilizing the submarine vehicle 185. This vehicle may have means for self-propulsion or for traction along the sea bed, but as shown, it is provided with means for lifting by the lift line 192 and means for towing in a forward direction by the towline 191. The lift line may be from another vehicle above the submarine vehicle 185, for example a helicopter, or may be a surface vessel 198 on the surface of the water. This surface vessel 198 may carry two winches, one for the towline and one for the lift line, plus having a sonar unit 199 to determine the depth to the sea bed 200.

FIG. 22 also shows that more than one submarine vehicle 185 may be used and a plurality, namely four, are illustrated in FIG. 22 as vehicles 185A through 185D. The submarine vehicles each have individual means for lifting and towing and, as shown in FIG. 22, the surface vessel 198 is a lead vessel, with an aft vessel 201 connected to lift and tow the submarine vehicle 185D, and vessels, either dories or self-propelled boats 202 and 203 are provided to lift and tow the submarine vehicles 185B and 185C, respectively. Each of the boats 202 and 203 and the aft surface vessel 201 would have two winches, one for the towline and one for the lift line. The forward surface vessel is a power boat which is connected by towlines to the boats 202 and 203 and to the aft vessel 201, which maintains alignment spacing and corrects for side drift.

Figure 23:
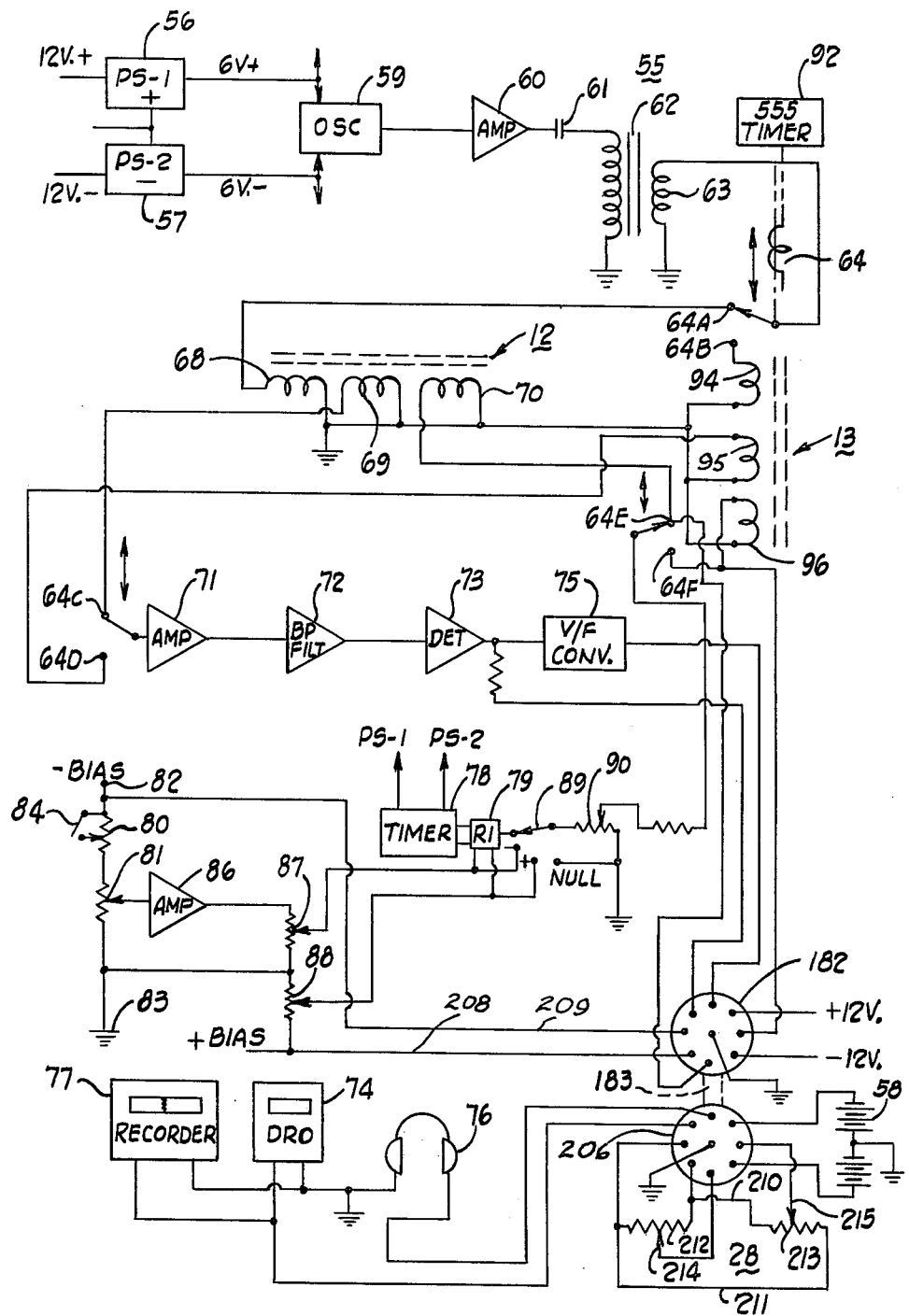
FIG. 23 is a schematic diagram of the electrical circuit of the prospecting system of FIG. 22.

FIG. 23 illustrates the schematic diagram of the angle measuring means 11A within the underwater chamber 180. This angle measuring means 11A is basically the same as the angle measuring means 11 of FIG. 5, with the exception of provision for some of the electrical components to be in the surface vessel, such as vessel 198. The same reference numerals are used in FIG. 23 as in FIG. 5, where the components are identical. One difference is that a number of electrical conductors are brought out to the cable connection 182 and then pass through the nine-conductor control cable 183 to a cable connection 206 at the surface vessel. Also, the batteries 58, headphones 76, digital readout 74, and recorder 77 have been removed from the electrical circuit at the submarine vehicle and brought to the surface vessel. More importantly, a part of the adjustment means 28 is removed from the submarine vehicle 185 and placed in the surface vessel. In the submarine vehicle, conductors 208 and 209 supply the positive and negative biases respectively to the cable connection 182. From the cable connection 206, positive and negative conductors 210 and 211, respectively, supply the positive and negative bias to heliopots 212 and 213. The movable wipers 214 and 215 supply, respectively, the vertical and the horizontal neutralizing bias, either positive or negative, depending upon the adjustment, back through the control cable 183 to the vertical or horizontal feedback windings 70 and 96, respectively. In this manner, remote electronic adjustment of the feedback is provided to both the vertical and horizontal magnetic detection units in the submarine vehicle 185.

In operation, the submarine vehicle or vehicles may be used quite similarly to the system on dry land. Assuming that it is decided to tow a string of submarine vehicles due magnetic north, then the individual angle measuring means 11A within the submarine vehicles are given an initial orientation while the submarine vehicles are out of the water. The access door 193 may be opened and the angle measuring means 11A physically adjusted. For example, if the appropriate tables for that latitude show that the vertical dip needle angle of inclination is 71 degrees, then the vertical wheel 31 would be pre-adjusted to the 71 degree angle of inclination. With the intended course of the vessels 198 and 201 magnetic north, then the horizontal plate 22 would be adjusted to be aimed directly at the forward point of the submarine vehicle 185. The access door 193 would be closed, and the submarine vehicles could be lowered, or preferably would be kept within the surface vessels until reaching the desired site at which the geomagnetic prospecting would begin. At such site, the sonar 199 would determine the depth and the lift winches could be activated to lower the submarine vehicles to the sea bed 200. A slight forward movement as the vehicles were lowered to the bottom, this forward movement being controlled by the towline 191, would assure that the submarine vehicles were all oriented toward magnetic north. This would be assured by the vanes 184 and 190. The weights 186 relative to the buoyancy of the instrument chamber 180 will assure that the vehicle 185 settles to the sea bed in proper north orientation and approximately level as established by the tripod 188. The angle measuring means 11A may be energized and the headphones 76 utilized to obtain a rough null of the vertical and horizontal magnetic detection units 12 and 13 by actuating the heliopots 212 and 213, respectively. This is an advantage of the remote electronic control of the neutralizing or feedback because it may be carried out from the surface vessels rather than requiring manned submarine vehicles, which would be much more expen- sive.

As stated above, the field pattern of the detection units 12 and 13 is a figure 8 pattern, or really two contiguous spheres. If by some chance the tripod is set down on the sea bed 200 in an attitude, e.g., 20 degrees off the horizontal, then this might require an unnecessarily large amount of feedback from the heliopot 212 to null or nearly null the vertical inclination detection unit 12 or, for that matter, to null the horizontal declination detection unit 13. In such case, the submarine vehicle 185 could be lifted by the winch and set down again for another attempt at a null balance. Once the submarine vehicle or vehicles are resting on the sea bed 200, the retractible prods 189 resist movement of the tripod due to any water currents. Also, the large vanes 184, being of insulation material, serve as local electric field baffles in two directional dimensions. These reduce local induction from conductive water currents immediately around the instrument chamber 180. Once adjusted to a null, or preferably slightly off null, to a sensitive portion of the curve 126, shown in FIG. 6, the underwater angle measuring means 11A may be used in the same manner as in the single instrument of FIGS. 1–3 or the plural instruments in the plural station sites of FIG. 7. When plural instruments are used as shown in FIG. 22, then the lead boat 198 sets the towing speed and determines the depth by the sonar 199 to which the submarine vehicles are lowered. When towing to the next group of station sites on the sea bed 200, the submarine vehicles 185A–185D may be raised slightly by the lift lines and then towed by the towlines 191 in the position 185A' through 185C', with 185D' not shown. This saves time between setups for station sites in not having to lift the submarine vehicles completely to the surface. At the next group of station sites, the lead boat 198 advises by radio the other craft 201 and the men in the boats 202 and 203 of the expected depth of the sea bed when stopping and preparing to set the instrumented submarine vehicles on the sea bed. When the instrumented vehicles are on the sea bed, ten to twenty minutes' stationary recording to note any change in the magnetic angles is sufficient. The orientation of the detection units 12 and 13 within the submarine vehicle and the orientation of the vehicle during towing and setting down on the sea bed together act as a means to orient the detection units at a stationary site on the bed of a body of water on the earth. The heliopots 212 and 213 are a part of the adjustment means to get the null or near null condition so that the small changes in the magnetic field direction may be observed over the one to twenty-minute period. The towline 191 and lift line 192 are each tension lines between the surface vehicle and the submarine vehicle to control the orientation of the submarine vehicle and to move it to a new station site.

Preferably, the tow and lift lines are of nonmagnetic construction so that any wave motion of the cables does not affect the angle measurement readings. The subsea system may also be utilized during the transit mode. This is a rough determination of the earth's magnetic field for physically setting the towing angle but is too coarse for induced magnetic field determinations. However, this is a valuable part of the prospecting procedure between the second modes of operation, wherein the submarine vehicles are set on the sea bed 200. Any magnetically permeable wire cables or wire fences will distort and reduce the earth's telluric currents, so the present invention has the advantage of requiring no cables on the sea bed 200.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A prospecting method using magnetic field angle measuring means to determine the presence of hydrocarbon-bearing substrata comprising the steps of:
    establishing angle measuring means at a station site to determine the inclination and declination angles of the magnetic field of the earth,
    adjusting said angle measuring means to a condition of high sensitivity to changes of the magnetic field of the earth,
    measuring said inclination and declination angles, during a first time interval in the order of one to ten minutes' duration without moving the angle measuring means from the station site, and indicating in digital form the vlaues of said inclination and declination angles and observing changes therein.

2. A prospecting method as set forth in claim 1, wherein said adjusting step includes electrically adjusting the angle measuring means to substantially a null of the magnetic field of the earth.

3. A prospecting method as set forth in claim 1, including measuring substantially simultaneously both said inclination and declination angles.

4. A prospecting method as set forth in claim 1, including adjusting said angle measuring means by varying an electrical parameter.

5. A prospecting method as set forth in claim 1, including measuring and indicating the inclination declination angles at a second station site during a time period in the order of one to ten minutes' duration.

6. A prospective method as set forth in claim 5, wherein said measuring and indicating of the angles at said second station site is accomplished during said first time period.

7. A prospecting method as set forth in claim 5, wherein said measuring and indicating of the angles at said second station site is accomplished during a second later time period.

8. A prospecting method as set forth in claim 5, including correlating any change in angles at said first site with any change in angles at said second site.

9. A prospecting method as set forth in claim 8, wherein said correlating step includes substantially continuously monitoring the declination angle at a station site.

10. The method of utilizing magnetic detection units in the geomagnetic determination of the earth below the surface thereof, comprising the steps of:
    establishing a station site on the earth;
    placing at said site first and second magnetic detection units capable of determining first and second magnetic null angles, and respective first and second signals dependent upon the magnetic field direction of the earth;
    adjusting said first unit to establish said first angle and said first signal dependent on substantially a null of the magnetic field of the earth in a first plane which includes the dip angle of inclination for that latitude;

adjusting said second unit to establish said second angle and said second signal dependent on substantially a null of the magnetic field of the earth in a second plane perpendicular to said first plane;

indicating each of said two signals during a first time period in the order of one to ten minutes; and experimentally determining the presence of a hydrocarbon bearing substrata below said station site upon the magnetic null of said first angle having a change during said first time period toward north and the magnetic null of said second angle having a change during said first time period toward west.

11. The method as set forth in claim 10, wherein said indicating step includes recording the values of said signals.

12. The method as set forth in claim 10, including a plurality of detection units with a first and second detection unit at each of a plurality of station sites.

13. The method as set forth in claim 12, including periodically relocating at least one of said plurality of detection units to new station sites, indicating each of said first and second signals at a later time period, and establishing the extent of a field of hydrocarbons by those adjacent station sites whereat said first angles therefrom during any said time period have a change toward north and said second angles therefrom have a change toward west.

14. The method as set forth in claim 12, including relocating a plurality of said detection units to new station sites after said first time period and indicating another set of first and second signals during a second time period in the order of one to ten minutes duration.

15. The method as set forth in claim 14, including maintaining at least one station site without physical relocation as a control site to aid correlation between the signals indicated during said first and second time periods.

16. The method as set forth in claim 14, including correlating said first set of signals with said second set of signals.

17. The method as set forth in claim 16, wherein said correlating step includes maintaining the detection units without physical change at at least one of said station sites for repetitive sets of signals therefrom during said first and second time periods.

18. The method as set forth in claim 16, wherein said correlating step includes the substantially continuous monitoring in one location of said second signal.

19. The method as set forth in claim 10, wherein said signals are indicated during conditions of relatively rapid diurnal changes in the telluric current of the earth.

20. The method as set forth in claim 10, wherein said indicating step occurs during the time period of the telluric current diurnal morning reversal.

21. The method of utilizing a submarine vehicle and magnetic detection units in geomagnetic prospecting, comprising the steps of:

mounting in a submarine vehicle first and second magnetic detection units capable of determining first and second magnetic null angles and first and second signals, respectively, dependent upon the magnetic field direction of the earth;

orienting said vehicle in a stationary position on the bed of a body of water on the earth;

electrically adjusting said first unit in accordance with said mounting and orienting to establish said first angle and said first signal dependent on substantially a null of the magnetic field of the earth in a first plane which includes the dip angle of inclination for that latitude;

electrically adjusting said second unit in accordance with said mounting and orienting to establish said second angle and said second signal dependent on substantially a null of the magnetic field of the earth in a second plane perpendicular to said first plane;

indicating each of said two signals during a first time period in the order of one to ten minutes; and experimentally determining the presence of a westerly dipping hydrocarbon bearing substrata below the bed of the body of water and below said vehicle upon said first angle having a change during said first time period toward north and said second angle having a change during said first time period toward west.

22. The method as set forth in claim 21, including adjusting said first and second unit by remote electronic means.

23. The method as set forth in claim 21, including connecting the submarine vehicle with a water surface vessel, and electronically adjusting said units from said surface vessel.

* * * * *